US009986316B2

(12) United States Patent
Bogoni et al.

(10) Patent No.: US 9,986,316 B2
(45) Date of Patent: May 29, 2018

(54) OPTICAL SWITCHING

(71) Applicant: Telefonaktiebolaget L M Ericsson (publ), Stockholm (SE)

(72) Inventors: Antonella Bogoni, Pisa (IT); Piero Castoldi, Pisa (IT); Isabella Cerutti, Pisa (IT); Mirco Scaffardi, Pisa (IT); Nicola Andriolli, Pisa (IT)

(73) Assignee: Telefonaktiebolget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 14/912,980

(22) PCT Filed: Aug. 21, 2013

(86) PCT No.: PCT/EP2013/067362
§ 371 (c)(1),
(2) Date: Feb. 19, 2016

(87) PCT Pub. No.: WO2015/024595
PCT Pub. Date: Feb. 26, 2015

(65) Prior Publication Data
US 2016/0212510 A1    Jul. 21, 2016

(51) Int. Cl.
*H04J 14/04* (2006.01)
*H04J 14/00* (2006.01)
*H04Q 11/00* (2006.01)

(52) U.S. Cl.
CPC .......... *H04Q 11/0005* (2013.01); *H04J 14/04* (2013.01); *H04J 14/00* (2013.01);
(Continued)

(58) Field of Classification Search
CPC combination set(s) only.
See application file for complete search history.

(56) References Cited

U.S. PATENT DOCUMENTS 5,651,080 A     7/1997   Chu
2005/0259914 A1*  11/2005   Padgett ................. H01Q 21/26
385/16
(Continued)

FOREIGN PATENT DOCUMENTS

WO     WO 2010/072247 A1    7/2010
WO     WO 2010/127716 A1    11/2010

OTHER PUBLICATIONS

Yang Yue,Reconfigurable switching of orbital-angular-momentumbased free-space data channels,Optics Letters / vol. 38, No. 23 / Dec. 1, 2013, Received Jul. 26, 2013; revised Sep. 23, 2013; accepted Oct. 25, 2013; posted Oct. 25, 2013 (Doc. ID 194704); published Nov. 26, 2013,pp. 5118-5120.*
(Continued)

*Primary Examiner* — David Payne
*Assistant Examiner* — Omar S Ismail
(74) *Attorney, Agent, or Firm* — Baker Botts, LLP

(57) ABSTRACT

An optical switch (10) comprising: inputs (12) to receive input optical signals at respective wavelengths and having planar wavefronts; conversion apparatus (14) to convert each input optical signal into a respective optical signal having a respective helical wavefront, each helical wavefront having a different orbital angular momentum, OAM; optical multiplexing apparatus (16) to receive each helical wavefront optical signal from the conversion apparatus and to multiplex the helical wavefront optical signals into an OAM multiplexed optical signal; and optical demultiplexing apparatus (18) comprising a plurality of outputs (20), the optical demultiplexing apparatus arranged to: receive the OAM multiplexed optical signal; demultiplex the OAM multiplexed optical signal into a plurality of wavelength multiplexed optical signals each having a different OAM; reconvert each wavelength multiplexed optical signal from its helical wavefront into a respective planar wavefront; and
(Continued)

deliver each planar wavefront wavelength multiplexed optical signal to a respective one of the outputs according to the respective OAM it had before reconversion.

13 Claims, 10 Drawing Sheets

(52) U.S. Cl.
CPC ............... *H04Q 2011/0015* (2013.01); *H04Q 2011/0016* (2013.01); *H04Q 2011/0026* (2013.01); *H04Q 2011/0028* (2013.01); *H04Q 2011/0035* (2013.01)

(56) References Cited

U.S. PATENT DOCUMENTS

| | | | | |
|---|---|---|---|---|
| 2009/0324243 | A1* | 12/2009 | Neilson | H04Q 11/0005 398/154 |
| 2012/0207470 | A1* | 8/2012 | Djordjevic | H04B 10/25 398/44 |
| 2013/0148963 | A1 | 6/2013 | Cvijetic | |
| 2013/0235744 | A1* | 9/2013 | Chen | H04L 47/82 370/252 |
| 2015/0146815 | A1* | 5/2015 | Berretta | H04L 5/04 375/279 |

OTHER PUBLICATIONS

Alison M. Yao,Orbital angular momentum: origins,behavior and applications,Advances in Optics and Photonics 3, 161-204 (2011),Received Oct. 8, 2010; revised Jan. 5, 2011; accepted Jan. 5, 2011;published May 15, 2011 (Doc. ID 136333),pp. 168-175.*
Yang Yue,Reconfigurable Orbital-Angular-Momentum-Based Switching among Multiple 100-Gbit/s Data Channels,6/13/ $31.00 © 2013 Optical Society of America,OFC/NFOEC Technical Digest © 2013 OSA,pp. 1-3.*
Yang Yue,Reconfigurable Orbital-Angular-Momentum-Based Switching among Multiple 100-Gbit/s Data Channels,6/13/ © 2013 Optical Society of America,OFC/NFOEC Technical Digest © 2013 OSA,pp. 1-3.*
Yang Yue,Reconfigurable switching of orbital-angular-momentumbased free-space data channels,Optics Letters / vol. 38, No. 23 / Dec. 1, 2013,Received Jul. 26, 2013; revised Sep. 23, 2013; accepted Oct. 25, 2013; posted Oct. 25, 2013 (Doc. ID 194704); published Nov. 26, 2013,pp. 5118-5120.*
Alison M. Yao,Orbital angular momentum: origins,behavior and applications,Advances in Optics and Photonics 3, 161-204 (2011),Received Oct. 8, 2010; revised Jan. 5, 2011; accepted Jan. 5, 2011 published May 15, 2011 (Doc. ID 136333),pp. 168-175.*
Yang Yue,Reconfigurable Orbital-Angular-Momentum-Based Switching among Multiple 100-Gbit/s Data Channels,6/13/ © 2013 Optical Society of America,OFC/NFOEC Technical Digest © 2013 OSA, pp. 1-3.*
"A Scalable Space-Time Multi-Plane Optical Interconnection Network Using Energy-Efficient Enabling Technologies [Invited]" by Liboiron-Ladouceur et al.; vol. 3, No. 8/ J. Opt. Commun. Netw, Aug. 2011.
"Atmospheric Turbulence and Orbital Angular Momentum of Single Photons for Optical Communication" by C. Paterson; Physical Review Letters; PRL 94; 153901 (2005), Apr. 22, 2005.
"Can Simple Optical Switching Fabrics Scale to Terabit per Second Switch Capacities?" by Gaudino et al.; J. Opt. Commun. Netw./vol. 1, No. 3, Aug. 2009.
"Cost-effective optics: Enabling the Exascale Roadmap" by Alan F. Benner; 17th IEEE Symposium on High Performance Interconnects, 2009.
"Device Requirements for Optical Interconnects to Silicon Chips" by David A.B. Miller; Invited Paper; Proceedings of the IEEE/vol. 97, No. 7, Jul. 2009.
"Efficient multiplexing and demultiplexing of free-space orbital angular momentum using phonic integrated circuits" by Nicolas K. Fontaine et al.; OFC/NFOEC Technical Digest, 2012.
"Energy-Efficient Design of a Scalable Optical Multiplane Interconnection Architecture" by Liboiron-Ladouceur et al.; IEEE Journal of Selected Topics in Quantum Electronics, vol. 17, No. 2, Mar./Apr. 2011.
"Generating in-Plane Optical Orbital Angular Momentum Beams with Silicon Waveguides" by Zhang et al.; vol. 5, No. 2; IEEE Photonics Journal, Apr. 2013.
"Integrated Compact Optical Vortex Beam Emitters" by Xinlun Cai et al.; Science 338, 363; DOI: 10.1126/science.1226528, 2012.
"Light with a twist in its tail" by Miles Padgett and L. Allen; Contemporary Physics, 2000, vol. 41, No. 5, pp. 275-285, 2000.
"Long-range fiber-transmission of photons with orbital angular momentum" by Bozinovic et al., Apr. 2011.
"Orbital angular momentum of light and the transformation of Laguerre-Gaussian laser modes" by L. Allen et al.; A Physical Review, vol. 45, No. 11, Jun. 1, 1992.
"Power of scalability analysis of multi-plane optical interconnection networks" by I. Cerutti et al.; Published in IET Optoelectronics; Special Issue—Green Photonics, Dec. 31, 2010.
"Power Comparison Between High-Speed Electrical and Optical Interconnects for Interchip Communication" by Hoyeol Cho et al.; Journal of Lightwave Technology, vol. 22, No. 9, Sep. 2004.
"Reconfigurable Orbital-Angular-Momentum-Based Switching among Multiple 100-Gbit/s Data Channels" by Yang Yue et al.; OFC/NFOEC Technical Digest, 2013.
"Rotating light with light: Generation of helical modes of light by spin-to-orbital angular momentum conversion in inhomogeneous liquid crystals" by Lorenzo Marrucci; Society of Photo-Optical Instrumentation Engineers (SPIE), 2007.
International Search Report for International application No. PCT/EP2013/067362, Jun. 2, 2014.
"Terabit free-space data transmission employing orbital angular momentum multiplexing" by Jian Wang et al.; Articles Published Online: Jun. 24, 2012/DOI 10.1038/NPHOTON.2012.138; Nature Photonics, Jun. 24, 2012.
"The Impact of Power and Cooling on Data Center Infrastructure" by J. Humphreys et al.; IDC Analyze the Future; www.idc.com, Aug. 2013.
White Paper; Uptime Institute; "The Invisible Crisis in the Data Center: The Economic Meltdown of Moore's Law", 2007.
"Two-step scheduling framework for space-wavelength modular optical interconnection networks" by P.G. Raponi et al.; Published in IET Communications; doi: 10.1049/iet-com.2010.0118, Feb. 8, 2010.

\* cited by examiner

OPTICAL SWITCHING

PRIORITY

This nonprovisional application is a U.S. National Stage Filing under 35 U.S.C. § 371 of International Patent Application Serial No. PCT/EP2013/067362, filed Aug. 21, 2013, and entitled "Optical Switching."

TECHNICAL FIELD

The invention relates to an optical switch, a method of switching optical signals, an optical interconnection network, a method of routing data cells across an optical interconnection network and a data centre.

BACKGROUND

The growth of the internet traffic is causing a corresponding growth in data centers, which employ a large number of servers connected with a network infrastructure. The scalability of current electrical interconnection networks will be soon limited by their power consumption and related power dissipation and footprint issues. In order to overcome these issues optical switching can be exploited, enabling the realization of high capacity and reconfigurable interconnection networks with low power consumption.

To enhance the scalability of the optical interconnection networks, multiple switching domains can be exploited. Multi-plane interconnection networks are composed of a number of transmitter cards and receiver cards, each of them supporting a number of ports, which are optically interconnected. The traditional switching domains used for flexible switching of data packets across all ports and cards are space, wavelength, and time. Space and wavelength domains can be used to switch optical packets among cards and ports respectively, as described in WO2010/127716. Another approach consists of using the space domain to switch packets among cards and time domain to switch among the card ports. This approach requires pulse-width compression (which is a critical process) or by expanding serial packets in the wavelength domain through wavelength-striped techniques.

SUMMARY

It is an object to provide an improved optical switch. It is a further object to provide an improved method of switching optical signals. It is a further object to provide an improved an optical interconnection network. It is a further object to provide an improved a method of routing data cells across an optical interconnection network. It is a further object to provide an improved a data centre.

A first aspect of the invention provides an optical switch comprising a plurality of inputs, conversion apparatus, optical multiplexing apparatus, and optical demultiplexing apparatus. The inputs are each arranged to receive a respective input optical signal at one of a plurality of wavelengths. Each input optical signal has a respective planar wavefront. The conversion apparatus is arranged to receive each input optical signal and is arranged to convert each input optical signal into a respective optical signal having a respective one of a plurality of helical wavefronts, each helical wavefront having a different orbital angular momentum. The optical multiplexing apparatus is arranged to receive each helical wavefront optical signal from the conversion apparatus and is arranged to multiplex the helical wavefront optical signals into an orbital angular momentum multiplexed optical signal. The optical demultiplexing apparatus comprises a plurality of outputs. The optical demultiplexing apparatus is arranged to receive the orbital angular momentum multiplexed optical signal. The optical demultiplexing apparatus is arranged to demultiplex the orbital angular momentum multiplexed optical signal into a plurality of wavelength multiplexed optical signals each having a different one of the orbital angular momenta. The optical demultiplexing apparatus is arranged to reconvert each wavelength multiplexed optical signal from its helical wavefront into a respective planar wavefront. The optical demultiplexing apparatus is arranged to deliver each planar wavefront wavelength multiplexed optical signal to a respective one of the outputs according to the respective orbital angular momentum it had before reconversion.

The simultaneous exploitation of the orbital angular momentum, OAM, domain and the wavelength domain may allow an increase in scalability and energy efficiency of optical networks, while avoiding the switching speed, complexity and power consumption issues of optical space switching. The optical switch may enable a reduction in power consumption and in switching speed due to the lack of active space-switching elements. With this architecture wavelength multiplexing on the outputs of the optical switch is not needed. Since helical wavefronts are orthogonal, an infinite number of different orbital angular momenta can in principle be used, which may enable high scalability for the optical switch. The optical switch may be implemented with a high number of outputs in order to leave space for future expansion. The optical multiplexing and demultiplexing of the helical wavefront optical signals performed by the optical switch are wavelength independent, meaning that the optical switch simultaneously switches all wavelengths having a given helical wavefront shape, i.e. orbital angular momentum, without requiring wavelength multiplexing at the optical switch outputs.

In an embodiment, the conversion apparatus comprises a plurality of orbital angular momentum modulators. Each orbital angular momentum modulator is arranged to receive a respective input optical signal and is arranged to convert said input optical signal into a respective optical signal having a respective one of the plurality of helical wavefronts. Each input optical signal may be independently converted into a respective optical signal having a respective helical wavefront, having a different OAM, which may be referred to as a different OAM mode. The OAM, and thus the destination switch output, may be selected for each input optical signal.

In an embodiment, the optical switch further comprises a mode scheduler arranged to assign one of the plurality of orbital angular momenta to each input optical signal received at the conversion apparatus. The mode scheduler is arranged to generate and transmit to each orbital angular momentum modulator at least one conversion control signal arranged to cause it to convert said input optical signal from its planar wavefront into a respective helical wavefront having the corresponding assigned orbital angular momentum. The destination output for each input optical signal may therefore be controlled.

In an embodiment, each orbital angular momentum modulator is able to convert said input optical signal into a respective optical signal having any one of the plurality of helical wavefronts and each orbital angular momentum modulator is arranged to convert said input optical signal into a respective optical signal having the helical wavefront corresponding to the assigned orbital angular momentum.

Each input optical signal may be assigned any one of the orbital angular momenta, which may enable each input optical signal to be output to any of the outputs of the optical switch. This may enable the optical switch to avoid contentions where more than one input optical signal having the same assigned wavelength is sent to the same output.

In an embodiment, the optical demultiplexing apparatus comprises optical splitting apparatus and a plurality of orbital angular momentum demodulators. The optical splitting apparatus is arranged to receive the orbital angular momentum multiplexed optical signal and is arranged to split the orbital angular momentum multiplexed optical signal into a plurality of replica signals. The orbital angular momentum demodulators are each coupled to a respective output of the optical demultiplexing apparatus. The orbital angular momentum demodulators are each arranged to receive a respective one of the replica orbital angular momentum multiplexed optical signals and are each arranged to reconvert optical signals having a respective preselected one of the helical wavefronts into a wavelength multiplexed optical signal having a respective planar wavefront. The orbital angular momentum demodulators are each arranged to deliver the reconverted wavelength multiplexed optical signal to its respective output. The optical demultiplexing apparatus separates the OAM multiplexed optical signals according to their helical wavefront shape, i.e. according to their OAM mode. The demultiplexing apparatus receives a plurality of optical signals at a single input and simultaneously directs all wavelengths having a given helical wavefront, OAM mode, toward a specific output. With this architecture wavelength multiplexing on the output ports of the optical switch is not needed. For each OAM multiplexed optical signal, each demodulator converts a preselected helical wavefront to planar wavefront, keeping the wavelength of each of the multiplexed signals unchanged. Each OAM demodulator may demodulate at the same time a plurality, M, of optical signals each having a different one of a plurality, M, wavelengths, thus only a single demodulator is necessary for each optical switch output.

In an embodiment, each input optical signal has a Hermite-Gaussian transverse mode and each orbital angular momentum modulator and each orbital angular momentum demodulator comprises a spiral phase mask. The input Hermite-Gaussian transverse mode optical signal has a planar wavefront. The OAM modulators apply a spiral phase mask to the planar wavefront, converting it into a helical wavefront, also known as a Laguerre-Gaussian mode, thereby giving the input optical signal an orbital angular momentum. Each OAM modulator applies a different spiral phase mask, thereby forming a different helical wavefront having a different OAM. The OAM demodulators operate in the reverse, converting a helical wavefront back into a planar wavefront.

In an embodiment, each input optical signal has a spin angular momentum and the conversion apparatus converts the spin angular momentum into an orbital angular momentum.

In an embodiment, each input optical signal has one of a transverse electric mode and a transverse magnetic mode and the conversion apparatus combines the input optical signal with the other of a transverse electric mode and a transverse magnetic mode to form the helical wavefront optical signals, each having a different orbital angular momentum.

In an embodiment, the spiral phase mask comprises a spatial light modulator. The spatial light modulator is programmable to operate at the assigned one of the plurality of orbital angular momenta. Each of the OAM modulators and demodulators may operate at any one of the plurality of OAMs by programming the spatial light modulator to apply a different spiral phase mask.

In an embodiment, the optical multiplexing apparatus comprises a cascade of beam combiners. In an embodiment, the optical multiplexing apparatus comprises a cascade of non-polarising beam splitters.

In an embodiment, the optical splitting apparatus comprises a passive optical splitter.

In an embodiment, the orbital angular momentum modulators and the optical multiplexing apparatus comprise a silicon integrated photonic circuit. In an embodiment, the optical demultiplexing apparatus and the orbital angular momentum demodulators comprise a silicon integrated photonic circuit. In an embodiment, the same silicon integrated photonic circuit is used for each.

In an embodiment, the inputs are arranged to receive input optical signals at a first plurality, M, of wavelengths and the optical demultiplexing apparatus has a second plurality, N, of outputs. The optical switch is arrange to receive a third plurality, NM, of input optical signals.

In an embodiment, the optical switch further comprises a plurality of wavelength division demultiplexers. Each wavelength division demultiplexer is arranged to receive a respective wavelength division multiplexed, WDM, input optical signal. Each wavelength division multiplexer is arranged to demultiplex each WDM input optical signal into a plurality of input optical signals each having a different one of the plurality of wavelengths and is arranged to deliver each input optical signal to a respective one of the inputs of the optical switch.

In an embodiment, the optical switch comprises a said second plurality, N, of wavelength division multiplexers and is arranged to receive a said second plurality, N, of WDM input optical signals, each WDM input optical signal comprising a plurality of input optical signals each having a different one of the first plurality, M, of wavelengths.

In an embodiment, each input optical signal is an information carrying optical signal. In an embodiment, each input optical signal has one of an amplitude modulation format and a phase modulation format.

A second aspect of the invention provides a method of switching optical signals. The method comprises receiving a plurality of input optical signals. Each input optical signal has one of a plurality of wavelengths and each has a respective planar wavefront. The method comprises converting each input optical signal into a respective optical signal having a respective one of a plurality of helical wavefronts, each helical wavefront having a different orbital angular momentum. The method comprises multiplexing the helical wavefront optical signals into an orbital angular momentum multiplexed optical signal. The method comprises demultiplexing the orbital angular momentum multiplexed optical signal into a plurality of wavelength multiplexed optical signals. Each wavelength multiplexed optical signal has a different one of the orbital angular momenta. The method comprises reconverting each wavelength multiplexed optical signal from its helical wavefront into a respective planar wavefront.

The simultaneous exploitation of the orbital angular momentum, OAM, domain and the wavelength domain may allow an increase in scalability and energy efficiency of switching within optical networks, while avoiding the switching speed, complexity and power consumption issues of optical space switching. The method may enable a reduction in power consumption and in switching speed due it not requiring the use of active space-switching elements. Since helical wavefronts are orthogonal, that is propagate together without interference, an infinite number of different helical wavefront shapes, and thus orbital angular momenta, can in principle be used, which may enable high scalability for the method. The optical multiplexing and demultiplexing of the helical wavefront optical signals are wavelength independent, meaning that the method may be used simultaneously to switch all wavelengths having a given helical wavefront shape, i.e. a given orbital angular momentum, without requiring wavelength multiplexing.

In an embodiment, the orbital angular momentum multiplexed optical signal is demultiplexed by splitting it into a plurality of replica signals and for each replica signal reconverting optical signals having a respective preselected one of the helical wavefronts into a wavelength multiplexed optical signal having a respective planar wavefront. The method separates the OAM multiplexed optical signals according to their helical wavefront shape, i.e. their OAM. During demultiplexing the method simultaneously outputs all wavelengths having a given helical wavefront, OAM mode, together. For each OAM multiplexed optical signal, the respective helical wavefront is converted to a respective planar wavefront, keeping the wavelength of each of the multiplexed signals unchanged. The method may demodulate at the same time a plurality, M, of optical signals each having a different one of a plurality, M, wavelengths, thus only a single conversion step is required for all wavelengths for each OAM.

In an embodiment, the method commences with receiving a plurality of wavelength division multiplexed, WDM, input optical signals. The method comprises demultiplexing each WDM input optical signal into a plurality of input optical signals each having a different one of the plurality of wavelengths.

In an embodiment, each input optical signal has a Hermite-Gaussian transverse mode and the method comprises converting each input optical signal from its planar wavefront into one of the plurality of helical wavefronts by applying a spiral phase mask to each input optical signal. The input Hermite-Gaussian transverse mode optical signal has a planar wavefront. The method applies a spiral phase mask to the planar wavefront, converting it into a helical wavefront, thereby giving the input optical signal an orbital angular momentum. A different spiral phase mask is applied to each input optical signal, thereby forming a respective optical signal having respective different helical wavefront shape, each helical wavefront shape having a different OAM for each input optical signal.

In an embodiment, each input optical signal has a spin angular momentum and the method comprises converting the spin angular momentum into an orbital angular momentum.

In an embodiment, each input optical signal has one of a transverse electric mode and a transverse magnetic mode and the method comprises combining the input optical signal with the other of a transverse electric mode and a transverse magnetic mode to form the helical wavefront optical signals, each having a different orbital angular momentum.

In an embodiment, the demodulation comprises applying a respective spiral phase mask to each OAM multiplexed optical signal. Optical signals each having a respective helical wavefront shape are thus converted back into a corresponding planar wavefront.

In an embodiment, each input optical signal is an information carrying optical signal. In an embodiment, each input optical signal has one of an amplitude modulation format and a phase modulation format.

A third aspect of the invention provides an optical interconnection network comprising an optical switch, a plurality of optical transmitter modules, a plurality of optical receiver modules and a mode scheduler. Each optical transmitter module is arranged to receive input electrical signals carrying data cells to be transmitted across the interconnection network. Each optical transmitter module comprises a wavelength scheduler and an electrical-to-optical converter. The wavelength scheduler is arranged to assign one of a plurality of wavelengths to each input electrical signal. The electrical-to-optical converter is arranged to convert each input electrical signal into an input optical signal at the respective assigned wavelength having a respective planar wavefront. The optical switch is arranged to receive the input optical signals from the optical transmitter modules. The optical switch comprises a plurality of inputs, conversion apparatus, optical multiplexing apparatus, and optical demultiplexing apparatus. The inputs are each arranged to receive a respective input optical signal at one of a plurality of wavelengths. Each input optical signal has a respective planar wavefront. The conversion apparatus is arranged to receive each input optical signal and is arranged to convert each input optical signal into a respective optical signal having a respective one of a plurality of helical wavefronts, each helical wavefront having a different orbital angular momentum. The optical multiplexing apparatus is arranged to receive each helical wavefront optical signal from the conversion apparatus and is arranged to multiplex the helical wavefront optical signals into an orbital angular momentum multiplexed optical signal. The optical demultiplexing apparatus comprises a plurality of outputs. The optical demultiplexing apparatus is arranged to receive the orbital angular momentum multiplexed optical signal. The optical demultiplexing apparatus is arranged to demultiplex the orbital angular momentum multiplexed optical signal into a plurality of wavelength multiplexed optical signals each having a different one of the orbital angular momenta. The optical demultiplexing apparatus is arranged to reconvert each wavelength multiplexed optical signal from its helical wavefront into a respective planar wavefront. The optical demultiplexing apparatus is arranged to deliver each planar wavefront wavelength multiplexed optical signal to a respective one of the outputs according to the respective orbital angular momentum it had before reconversion. Each optical receiver module is arranged to receive a respective planar wavefront wavelength multiplexed optical signal from a respective output of the optical demultiplexing apparatus of the optical switch. Each optical receiver module comprises a wavelength demultiplexer, an optical-to-electrical converter and a plurality of electrical output ports. The wavelength demultiplexer is arranged to demultiplex the respective planar wavefront wavelength multiplexed optical signal into a plurality of output optical signals each at one of the plurality of wavelengths. The optical-to-electrical converter is arranged to convert each output optical signal into a respective output electrical signal. Each electrical output port is arranged to output electrical signals converted from output optical signals at a respective one of the plurality of wavelengths. The mode scheduler is arranged to assign one of the plurality of orbital angular momenta to each input optical signal received at the conversion apparatus. The mode scheduler is arranged to generate and transmit to the conversion apparatus at least one conversion control signal arranged to cause it to convert each input optical signal from its planar wavefront into a respective helical wavefront having the corresponding assigned orbital angular momentum.

The optical interconnection network architecture implements switching between the electrical outputs in the wavelength domain, i.e. the destination electrical output is determined by the wavelength of the input optical signal, while switching among the receiver modules is implemented in the OAM domain. While in the prior art the destination receiver module is reached by driving a space switching matrix, in the optical interconnection network the destination receiver module is reached by selecting an appropriate OAM for each input electrical signal. The optical interconnection network provides a multi-layer interconnection network based on optical angular momentum multiplexing and wavelength division multiplexing switching. Since OAM modes are orthogonal, a very high number (in principle infinite) of different orbital angular momenta, OAM modes, can be exploited, thus enabling high scalability for the interconnection network.

The simultaneous exploitation of the orbital angular momentum, OAM, domain and the wavelength domain may allow an increase in scalability and energy efficiency of the optical interconnection network, while avoiding the switching speed, complexity and power consumption issues of optical space switching. The optical switch may enable a reduction in power consumption and in switching speed due to the lack of active space-switching elements. With this architecture wavelength multiplexing on the outputs of the optical switch is not needed. The optical switch may be implemented with a high number of outputs in order to leave space for future expansion requiring additional transmitter modules and receiver modules.

In an embodiment, there are the same number of optical receiver modules as there are orbital angular momenta and each optical receiver module has the same number of electrical output ports as the number of wavelengths. The selected OAM determines univocally the destination receiver module, independent of the wavelength of the input optical signal. The wavelength of the input optical signal determines the electrical output port to which it will be routed at the destination receiver module.

In an embodiment, each electrical-to-optical converter comprises an electrical cross-point switch, a plurality of fixed wavelength optical sources and a plurality of optical modulators, each arranged to modulate an optical signal output from a respective one of the fixed wavelength optical sources. A data cell is selected from one of the electrical input signals and sent to the electrical cross-point switch which routes the data cell to the modulator associated with the fixed wavelength source at the assigned wavelength. The wavelength assignment, and thus the selection of the optical modulator and the configuration of the cross-point switch, is performed according to the destination electrical output port of the data cell.

In an embodiment, each optical modulator is arranged to modulate an optical signal output from a respective one of the fixed wavelength optical sources to form a respective information carrying input optical signal. In an embodiment, each optical modulator is arranged to apply one of an amplitude modulation and a phase modulation to the optical signal to form an information carrying input optical signal.

In an embodiment, each electrical-to-optical converter comprises a plurality of wavelength tuneable optical sources and a plurality of optical modulators, each arranged to modulate an optical signal output from a respective one of the wavelength tuneable optical sources. This may simplify the structure of the electrical-to-optical converter by removing the requirement for the electrical cross-point switch.

In an embodiment, each transmitter module has a plurality of optical outputs, each arranged to output a respective input optical signal at a different one of the plurality of wavelengths. Each optical output of each transmitter module may be directly connected to a respective input of the optical switch.

In an embodiment, each transmitter module comprises a wavelength multiplexer arranged to receive the input optical signals from the electrical-to-optical converter and arranged to multiplex the input optical signals into a wavelength division multiplexed input optical signal. Each transmitter module may therefore output a single WDM optical signal, which may reduce the complexity of the optical connection between the transmitter modules and the optical switch.

In an embodiment, the optical switch further comprises a plurality of wavelength division demultiplexers. Each wavelength division demultiplexer is arranged to receive a respective wavelength division multiplexed, WDM, input optical signal. Each wavelength division demultiplexer is arranged to demultiplex each WDM input optical signal into a plurality of input optical signals each having a different one of the plurality of wavelengths and is arranged to deliver each input optical signal to a respective one of the inputs of the optical switch.

In an embodiment, each wavelength division multiplexer comprises one of an arrayed waveguide grating and a passive optical coupler. In an embodiment, each wavelength division demultiplexer comprises an arrayed waveguide grating.

In an embodiment, each optical-to-electrical converter comprises a plurality of photoreceivers.

In an embodiment, the mode scheduler is arranged to receive wavelength assignment information from each wavelength scheduler for a preselected time window. The mode scheduler is arranged to interrogate the wavelength assignment information for each transmitter module and the orbital angular momentum assigned by it to each input optical signal to identify any input optical signals having the same wavelength and orbital angular momentum. The mode scheduler is arranged to select a different orbital angular momentum for at least one of the identified input optical signals. The mode scheduler may prevent contentions arising at an electrical output port due to more than one optical signal having the same OAM and wavelength, and thus being directed to the same electrical output port of the same receiver module.

In an embodiment, the mode scheduler and the wavelength schedulers operate together using a two-step scheduling framework as described in WO2010/072247.

In an embodiment, the optical interconnection network comprises a first optical backplane coupling the optical transmitter modules to the optical switch and a second optical backplane connecting the optical switch to the optical receiver modules. Each optical backplane comprises one of freespace optical connections, optical fibres and integrated optical waveguides.

In an embodiment, the conversion apparatus comprises a plurality of orbital angular momentum modulators. Each orbital angular momentum modulator is arranged to receive a respective input optical signal and is arranged to convert said input optical signal into a respective optical signal having a respective one of the plurality of helical wavefronts. Each input optical signal may be independently converted into a respective optical signal having a respective helical wavefront shape. Each helical wavefront shape has a different OAM, which may be referred to as a different OAM mode. The OAM, and thus the destination switch output, may be selected for each input optical signal.

In an embodiment, each orbital angular momentum modulator is able to convert said input optical signal into a respective optical signal having any one of the plurality of helical wavefronts and each orbital angular momentum modulator is arranged to convert said input optical signal into a respective optical signal the helical wavefront corresponding to the assigned orbital angular momentum. Each input optical signal may be assigned any one of the orbital angular momenta, which may enable each input optical signal to be output to any of the outputs of the optical switch. This may enable the optical interconnection network to avoid contentions where more than one input optical signal having the same assigned wavelength is sent to the same output.

In an embodiment, the optical demultiplexing apparatus comprises optical splitting apparatus and a plurality of orbital angular momentum demodulators. The optical splitting apparatus is arranged to receive the orbital angular momentum multiplexed optical signal and is arranged to split the orbital angular momentum multiplexed optical signal into a plurality of replica signals. The orbital angular momentum demodulators are each coupled to a respective output of the optical demultiplexing apparatus. The orbital angular momentum demodulators are each arranged to receive a respective one of the replica orbital angular momentum multiplexed optical signals and are each arranged to reconvert optical signals having a respective preselected one of the helical wavefronts into a wavelength multiplexed optical signal having a respective planar wavefront. The orbital angular momentum demodulators are each arranged to deliver the reconverted wavelength multiplexed optical signal to its respective output. The optical demultiplexing apparatus separates the OAM multiplexed optical signals according to their helical wavefront shape, i.e. according to their OAM mode. The demultiplexing apparatus receives a plurality of optical signals at a single input and simultaneously directs all wavelengths having a given helical wavefront, OAM mode, toward a specific output. With this architecture wavelength multiplexing on the output ports of the optical switch is not needed. For each OAM multiplexed optical signal, each demodulator converts a preselected helical wavefront to planar wavefront, keeping the wavelength of each of the multiplexed signals unchanged. Each OAM demodulator may demodulate at the same time a plurality, M, of optical signals each having a different one of a plurality, M, wavelengths, thus only a single demodulator is necessary for each optical switch output.

In an embodiment, each input optical signal has a Hermite-Gaussian transverse mode and each orbital angular momentum modulator and each orbital angular momentum demodulator comprises a spiral phase mask. The input Hermite-Gaussian transverse mode optical signal has a planar wavefront. The OAM modulators each apply a respective spiral phase mask to the planar wavefront of the respective input optical signal, converting it into a respective optical signal having a respective one of the helical wavefronts, each helical wavefront having a different orbital angular momentum. A helical wavefront is also known as a Laguerre Gaussina mode. Each OAM modulator applies a different spiral phase mask to its respective input optical signal, thereby forming a respective optical signal having a respective different helical wavefront, having a respective different OAM. The OAM demodulators operate in the reverse, each converting a respective helical wavefront back into a respective planar wavefront.

In an embodiment, each input optical signal has a spin angular momentum and the conversion apparatus converts the spin angular momentum into an orbital angular momentum.

In an embodiment, each input optical signal has one of a transverse electric mode and a transverse magnetic mode and the conversion apparatus combines the input optical signal with the other of a transverse electric mode and a transverse magnetic mode to form the helical wavefront optical signals, each having a different orbital angular momentum.

In an embodiment, the spiral phase mask comprises a spatial light modulator. The spatial light modulator is programmable to operate at the assigned one of the plurality of orbital angular momenta. Each of the OAM modulators and demodulators may operate at any one of the plurality of OAMs by programming the spatial light modulator to apply a different spiral phase mask.

In an embodiment, the optical multiplexing apparatus comprises a cascade of beam combiners. In an embodiment, the optical multiplexing apparatus comprises a cascade of non-polarising beam splitters.

In an embodiment, the optical splitting apparatus comprises a passive optical splitter.

In an embodiment, the orbital angular momentum modulators and the optical multiplexing apparatus comprise a silicon integrated photonic circuit. In an embodiment, the optical demultiplexing apparatus and the orbital angular momentum demodulators comprise a silicon integrated photonic circuit. In an embodiment, the same silicon integrated photonic circuit is used for each.

In an embodiment, the inputs are arranged to receive input optical signals at a first plurality, M, of wavelengths and the optical demultiplexing apparatus has a second plurality, N, of outputs. The optical switch is arrange to receive a third plurality, NM, of input optical signals. The optical interconnection network may be able to interconnect a total number of N×M input electrical signals received at N transmitter modules to N×M electrical output ports of N receiver modules.

A fourth aspect of the invention provides a method of routing data cells across an optical interconnection network from a respective electrical input port of a respective transmitter module to a respective one of a plurality of electrical output ports of a plurality of receiver modules. The method comprises receiving a plurality of input electrical signals each carrying a data cell to be routed. The method comprises assigning one of a plurality of helical wavefronts, each having a different orbital angular momentum, and one of a plurality of wavelengths to each input electrical signal. Each assigned helical wavefront shape and it associated orbital angular momentum indicates a destination one of the receiver modules and each assigned wavelength indicates a destination one of the output ports of the destination receiver module. The method comprises converting each input electrical signal into an input optical signal at the respective assigned wavelength, each input optical signal having a respective planar wavefront. The input optical signals are switched by converting each input optical signal from its planar wavefront into a respective optical signal having a respective one of a plurality of helical wavefronts, each helical wavefront having a different orbital angular momentum, and then multiplexing the helical wavefront optical signals into an orbital angular momentum multiplexed optical signal. The input optical signals are switched by then demultiplexing the orbital angular momentum multiplexed optical signal into a plurality of wavelength multiplexed optical signals. Each wavelength multiplexed optical signal has a different one of the orbital angular momenta. The input optical signals are switched by then reconverting each wavelength multiplexed optical signal from its helical wavefront into a respective planar wavefront. The method comprises delivering each planar wavefront wavelength division multiplexed optical signal to a respective one of the receiver modules according to the orbital angular momentum it had before reconversion. The method comprises demultiplexing each wavelength division multiplexed optical signal into a plurality of output optical signals each at one of the plurality of wavelengths and converting each output optical signal into a corresponding output electrical signal. The method comprises delivering each output electrical signal to a respective one of the electrical output ports of the respective receiver module, according to its preconversion optical wavelength.

The simultaneous exploitation of the orbital angular momentum, OAM, domain and the wavelength domain may allow an increase in scalability and energy efficiency of switching within optical networks, while avoiding the switching speed, complexity and power consumption issues of optical space switching. The method may enable a reduction in power consumption and in switching speed due it not requiring the use of active space-switching elements. Since helical wavefronts are orthogonal, that is propagate together without interference, an infinite number of different helical wavefront shapes, and thus orbital angular momenta, can in principle be used, which may enable high scalability for the method. The optical multiplexing and demultiplexing of the helical wavefront optical signals are wavelength independent, meaning that the method may be used simultaneously to switch all wavelengths having a given helical wavefront shape, i.e. a given orbital angular momentum, without requiring wavelength multiplexing.

In an embodiment, the method further comprises assigning the orbital angular momenta and the wavelengths to the input electrical signals such that input electrical signals assigned the same orbital angular momentum are each assigned a different one of the plurality of wavelengths. This may avoid contentions by avoiding having two data cells routed on optical signals having the same wavelength and OAM at the same time.

In an embodiment, when switching the input optical signals, the orbital angular momentum multiplexed optical signal is demultiplexed by splitting it into a plurality of replica signals and for each replica signal reconverting optical signals having a respective preselected one of the helical wavefronts into a wavelength multiplexed optical signal having a respective planar wavefront. The method separates the OAM multiplexed optical signals according to their helical wavefront shape, i.e. according to their OAM. During demultiplexing the method simultaneously outputs all wavelengths on a given OAM together. For each OAM multiplexed optical signal, a different, single preselected helical wavefront is converted to a planar wavefront, keeping the wavelength of each of the multiplexed signals unchanged. The method may demodulate at the same time a plurality, M, of optical signals each having a different one of a plurality, M, wavelengths, thus only a single conversion step is required for all wavelengths for each OAM.

In an embodiment, the method comprises, before switching the input optical signals, wavelength division multiplexing the input optical signals into a plurality of wavelength division multiplexed, WDM, input optical signals, each comprising a plurality of input optical signals each having a different one of the plurality of wavelengths. The method comprises transmitting the WDM input optical signals and then demultiplexing each WDM input optical signal back into its respective plurality of input optical signals.

In an embodiment, each input optical signal has a Hermite-Gaussian transverse mode and the method comprises converting each input optical signal from its planar wavefront into one of the plurality of helical wavefronts by applying a spiral phase mask to each input optical signal. The input Hermite-Gaussian transverse mode optical signal has a planar wavefront. The method applies a spiral phase mask to each input optical signal, converting it into a respective optical signal having a respective one of the helical wavefronts, thereby giving the input optical signal an orbital angular momentum. A different spiral phase mask is applied to each input optical signal, thereby forming a different helical wavefront having a different OAM for each input optical signal.

In an embodiment, each input optical signal has a spin angular momentum and the method comprises converting the spin angular momentum into an orbital angular momentum.

In an embodiment, each input optical signal has one of a transverse electric mode and a transverse magnetic mode and the method comprises combining the input optical signal with the other of a transverse electric mode and a transverse magnetic mode to form the helical wavefront optical signals, each having a different orbital angular momentum.

In an embodiment, the demodulation comprises applying a respective spiral phase mask to each replica OAM multiplexed optical signal. For each replica optical signal, optical signal having a respective one of the helical wavefronts re thus converted back into a respective corresponding planar wavefront.

In an embodiment, each input optical signal is an information carrying optical signal carrying the respective data cell. In an embodiment, each input optical signal has one of an amplitude modulation format and a phase modulation format.

In an embodiment, the method comprises modulating an optical signal having the assigned wavelength to form the information carrying input optical signal. In an embodiment, the method comprises applying one of an amplitude modulation and a phase modulation to the optical signal to form the information carrying input optical signal.

A fifth aspect of the invention provides a data centre comprising a plurality of computer servers, an optical interconnection network and a plurality of communication links, each connecting a respective server to the optical interconnection network. The optical interconnection network comprises an optical switch, a plurality of optical transmitter modules, a plurality of optical transmitter modules and a mode scheduler.

Each optical transmitter module is arranged to receive input electrical signals carrying data cells to be transmitted across the interconnection network. Each optical transmitter module comprises a wavelength scheduler and an electrical-to-optical converter. The wavelength scheduler is arranged to assign one of a plurality of wavelengths to each input electrical signal. The electrical-to-optical converter is arranged to convert each input electrical signal into an input optical signal at the respective assigned wavelength having a respective planar wavefront. The optical switch is arranged to receive the input optical signals from the optical transmitter modules. The optical switch comprises a plurality of inputs, conversion apparatus, optical multiplexing apparatus, and optical demultiplexing apparatus. The inputs are each arranged to receive a respective input optical signal at one of a plurality of wavelengths. Each input optical signal has a respective planar wavefront. The conversion apparatus is arranged to receive each input optical signal and is arranged to convert each input optical signal into a respective optical signal having a respective one of a plurality of helical wavefronts, each helical wavefront having a different orbital angular momentum. The optical multiplexing apparatus is arranged to receive each helical wavefront optical signal from the conversion apparatus and is arranged to multiplex the helical wavefront optical signals into an orbital angular momentum multiplexed optical signal. The optical demultiplexing apparatus comprises a plurality of outputs. The optical demultiplexing apparatus is arranged to receive the orbital angular momentum multiplexed optical signal. The optical demultiplexing apparatus is arranged to demultiplex the orbital angular momentum multiplexed optical signal into a plurality of wavelength multiplexed optical signals each having a different one of the orbital angular momenta. The optical demultiplexing apparatus is arranged to reconvert each wavelength multiplexed optical signal from its helical wavefront into a respective planar wavefront. The optical demultiplexing apparatus is arranged to deliver each planar wavefront wavelength multiplexed optical signal to a respective one of the outputs according to the respective orbital angular momentum it had before reconversion. Each optical receiver module is arranged to receive a respective planar wavefront wavelength multiplexed optical signal from a respective output of the optical demultiplexing apparatus of the optical switch. Each optical receiver module comprises a wavelength demultiplexer, an optical-to-electrical converter and a plurality of electrical output ports. The wavelength demultiplexer is arranged to demultiplex the respective planar wavefront wavelength multiplexed optical signal into a plurality of output optical signals each at one of the plurality of wavelengths. The optical-to-electrical converter is arranged to convert each output optical signal into a respective output electrical signal. Each electrical output port is arranged to output electrical signals converted from output optical signals at a respective one of the plurality of wavelengths. The mode scheduler is arranged to assign one of the plurality of orbital angular momenta to each input optical signal received at the conversion apparatus. The mode scheduler is arranged to generate and transmit to the conversion apparatus at least one conversion control signal arranged to cause it to convert each input optical signal from its planar wavefront into a respective helical wavefront having the corresponding assigned orbital angular momentum.

The optical interconnection network architecture implements switching between the electrical outputs in the wavelength domain, i.e. the destination electrical output is determined by the wavelength of the input optical signal, while switching among the receiver modules is implemented in the OAM domain. While in the prior art the destination receiver module is reached by driving a space switching matrix, in the optical interconnection network the destination receiver module is reached by selecting an appropriate OAM for each input electrical signal. The optical interconnection network provides a multi-layer interconnection network based on optical angular momentum multiplexing and wavelength division multiplexing switching. Since OAM modes are orthogonal, a very high number (in principle infinite) of different orbital angular momenta, OAM modes, can be exploited, thus enabling high scalability for the data centre.

The simultaneous exploitation of the orbital angular momentum, OAM, domain and the wavelength domain may allow an increase in scalability and energy efficiency of the data centre, while avoiding the switching speed, complexity and power consumption issues of optical space switching within the optical interconnection network. The optical switch may enable a reduction in power consumption and in switching speed due to the lack of active space-switching elements. The optical switch may be implemented with a high number of outputs in order to leave space for future expansion of the data centre requiring additional transmitter modules and receiver modules.

In an embodiment, there are the same number of optical receiver modules as there are orbital angular momenta and each optical receiver module has the same number of electrical output ports as the number of wavelengths. The selected OAM determines univocally the destination receiver module, independent of the wavelength of the input optical signal. The wavelength of the input optical signal determines the electrical output port to which it will be routed at the destination receiver module.

In an embodiment, each electrical-to-optical converter comprises an electrical cross-point switch, a plurality of fixed wavelength optical sources and a plurality of optical modulators, each arranged to modulate an optical signal output from a respective one of the fixed wavelength optical sources. A data cell is selected from one of the electrical input signals and sent to the electrical cross-point switch which routes the data cell to the modulator associated with the fixed wavelength source at the assigned wavelength. The wavelength assignment, and thus the selection of the optical modulator and the configuration of the cross-point switch, is performed according to the destination electrical output port of the data cell.

In an embodiment, each electrical-to-optical converter comprises a plurality of wavelength tuneable optical sources and a plurality of optical modulators, each arranged to modulate an optical signal output from a respective one of the wavelength tuneable optical sources. This may simplify the structure of the electrical-to-optical converter by removing the requirement for the electrical cross-point switch.

In an embodiment, each optical modulator is arranged to modulate an optical signal output from a respective one of the fixed wavelength optical sources to form a respective information carrying input optical signal. In an embodiment, each optical modulator is arranged to apply one of an amplitude modulation and a phase modulation to the optical signal to form an information carrying input optical signal.

In an embodiment, each transmitter module has a plurality of optical outputs, each arranged to output a respective input optical signal at a different one of the plurality of wavelengths. Each optical output of each transmitter module may be directly connected to a respective input of the optical switch.

In an embodiment, each transmitter module comprises a wavelength multiplexer arranged to receive the input optical signals from the electrical-to-optical converter and arranged to multiplex the input optical signals into a wavelength division multiplexed input optical signal. Each transmitter module may therefore output a single WDM optical signal, which may reduce the complexity of the optical connection between the transmitter modules and the optical switch.

In an embodiment, the optical switch further comprises a plurality of wavelength division demultiplexers. Each wavelength division demultiplexer is arranged to receive a respective wavelength division multiplexed, WDM, input optical signal. Each wavelength division multiplexer is arranged to demultiplex each WDM input optical signal into a plurality of input optical signals each having a different one of the plurality of wavelengths and is arranged to deliver each input optical signal to a respective one of the inputs of the optical switch.

In an embodiment, each wavelength division multiplexer comprises one of an arrayed waveguide grating and a passive optical coupler. In an embodiment, each wavelength division demultiplexer comprises an arrayed waveguide grating.

In an embodiment, each optical-to-electrical converter comprises a plurality of photoreceivers.

In an embodiment, the mode scheduler is arranged to receive wavelength assignment information from each wavelength scheduler for a preselected time window. The mode scheduler is arranged to interrogate the wavelength assignment information for each transmitter module and the orbital angular momentum assigned by it to each input optical signal to identify any input optical signals having the same wavelength and orbital angular momentum. The mode scheduler is arranged to select a different orbital angular momentum for at least one of the identified input optical signals. The mode scheduler may prevent contentions arising at an electrical output port due to more than one optical signal having the same OAM and wavelength, and thus being directed to the same electrical output port of the same receiver module.

In an embodiment, the mode scheduler and the wavelength schedulers operate together using a two-step scheduling framework as described in WO2010/072247.

In an embodiment, the optical interconnection network comprises a first optical backplane coupling the optical transmitter modules to the optical switch and a second optical backplane connecting the optical switch to the optical receiver modules. Each optical backplane comprises one of freespace optical connections, optical fibres and integrated optical waveguides.

In an embodiment, the conversion apparatus comprises a plurality of orbital angular momentum modulators. Each orbital angular momentum modulator is arranged to receive a respective input optical signal and is arranged to convert said input optical signal into a respective optical signal having a respective one of the plurality of helical wavefronts. Each input optical signal may be independently converted into a respective optical signal having a respective helical wavefront shape, having a different OAM, which may be referred to as a different OAM mode. The OAM, and thus the destination switch output, may be selected for each input optical signal.

In an embodiment, each orbital angular momentum modulator is able to convert said input optical signal into a respective optical signal having any one of the plurality of helical wavefronts and each orbital angular momentum modulator is arranged to convert said input optical signal into a respective optical signal having the respective helical wavefront corresponding to the assigned orbital angular momentum. Each input optical signal may be assigned any one of the orbital angular momenta, which may enable each input optical signal to be output to any of the outputs of the optical switch. This may enable the optical interconnection network to avoid contentions where more than one input optical signal having the same assigned wavelength is sent to the same output.

In an embodiment, the optical demultiplexing apparatus comprises optical splitting apparatus and a plurality of orbital angular momentum demodulators. The optical splitting apparatus is arranged to receive the orbital angular momentum multiplexed optical signal and is arranged to split the orbital angular momentum multiplexed optical signal into a plurality of replica signals. The orbital angular momentum demodulators are each coupled to a respective output of the optical demultiplexing apparatus. The orbital angular momentum demodulators are each arranged to receive a respective one of the replica orbital angular momentum multiplexed optical signals and are each arranged to reconvert optical signals having a respective preselected one of the helical wavefronts into a wavelength multiplexed optical signal having a respective planar wavefront. The orbital angular momentum demodulators are each arranged to deliver the reconverted wavelength multiplexed optical signal to its respective output. The optical demultiplexing apparatus separates the OAM multiplexed optical signals according to their helical wavefront shape, i.e. according to their OAM mode. The demultiplexing apparatus receives a plurality of optical signals at a single input and simultaneously directs all wavelengths having a given helical wavefront, OAM mode, toward a specific output. With this architecture wavelength multiplexing on the output ports of the optical switch is not needed. For each OAM multiplexed optical signal, each demodulator converts a preselected helical wavefront to planar wavefront, keeping the wavelength of each of the multiplexed signals unchanged. Each OAM demodulator may demodulate at the same time a plurality, M, of optical signals each having a different one of a plurality, M, wavelengths, thus only a single demodulator is necessary for each optical switch output.

In an embodiment, each input optical signal has a Hermite-Gaussian transverse mode and each orbital angular momentum modulator and each orbital angular momentum demodulator comprises a spiral phase mask. The input Hermite-Gaussian transverse mode optical signal has a planar phase front. The OAM modulators apply a spiral phase mask to the planar phase front, converting it into a helical phase front, also known as a Laguerre-Gaussian mode, thereby giving the input optical signal an orbital angular momentum. Each OAM modulator applies a different spiral phase mask, thereby forming a different helical phase front having a different OAM. The OAM demodulators operate in the reverse, converting a helical phase front back into a planar phase front.

In an embodiment, each input optical signal has a spin angular momentum and the conversion apparatus converts the spin angular momentum into an orbital angular momentum.

In an embodiment, each input optical signal has one of a transverse electric mode and a transverse magnetic mode and the conversion apparatus combines the input optical signal with the other of a transverse electric mode and a transverse magnetic mode to form the helical wavefront optical signals, each having a different orbital angular momentum.

The orbital angular momentum demodulators each simultaneously reconvert all of the wavelengths for their respective helical wavefront shape and orbital angular momentum. Each OAM demodulator can demodulate M signals at M different wavelengths at the same time, thus only a single demodulator is necessary for each destination card.

In an embodiment, the spiral phase mask comprises a spatial light modulator. The spatial light modulator is programmable to operate at the assigned one of the plurality of orbital angular momenta. Each of the OAM modulators and demodulators may operate at any one of the plurality of OAMs by programming the spatial light modulator to apply a respective different spiral phase mask.

In an embodiment, the optical multiplexing apparatus comprises a cascade of beam combiners. In an embodiment, the optical multiplexing apparatus comprises a cascade of non-polarising beam splitters.

In an embodiment, the optical splitting apparatus comprises a passive optical splitter.

In an embodiment, the orbital angular momentum modulators and the optical multiplexing apparatus comprise a silicon integrated photonic circuit. In an embodiment, the optical demultiplexing apparatus and the orbital angular momentum demodulators comprise a silicon integrated photonic circuit. In an embodiment, the same silicon integrated photonic circuit is used for each.

In an embodiment, the inputs are arranged to receive input optical signals at a first plurality, M, of wavelengths and the optical demultiplexing apparatus has a second plurality, N, of outputs. The optical switch is arrange to receive a third plurality, NM, of input optical signals. The optical interconnection network may be able to interconnect a total number of N×M input electrical signals received at N transmitter modules to N×M electrical output ports of N receiver modules.

In an embodiment, the optical switch comprises a said second plurality, N, of wavelength division multiplexers and is arranged to receive a said second plurality, N, of WDM input optical signals, each WDM input optical signal comprising a plurality of input optical signals each having a different one of the first plurality, M, of wavelengths.

A sixth aspect of the invention provides a data carrier having computer readable instructions embodied therein, the computer readable instructions being for providing access to resources available on a processor. The computer readable instructions comprise instructions to cause the processor to perform any of the above steps of the method of switching optical signals.

In an embodiment, the data carrier is a non-transitory data carrier.

A seventh aspect of the invention provides a data carrier having computer readable instructions embodied therein, the computer readable instructions being for providing access to resources available on a processor. The computer readable instructions comprising instructions to cause the processor to perform any of the above steps of the method of routing data cells across an optical interconnection network from a respective electrical input port of a respective transmitter module to a respective one of a plurality of electrical output ports of a plurality of receiver modules.

In an embodiment, the data carrier is a non-transitory data carrier.

Embodiments of the invention will now be described, by way of example only, with reference to the accompanying drawings.

DETAILED DESCRIPTION

Figure 1:
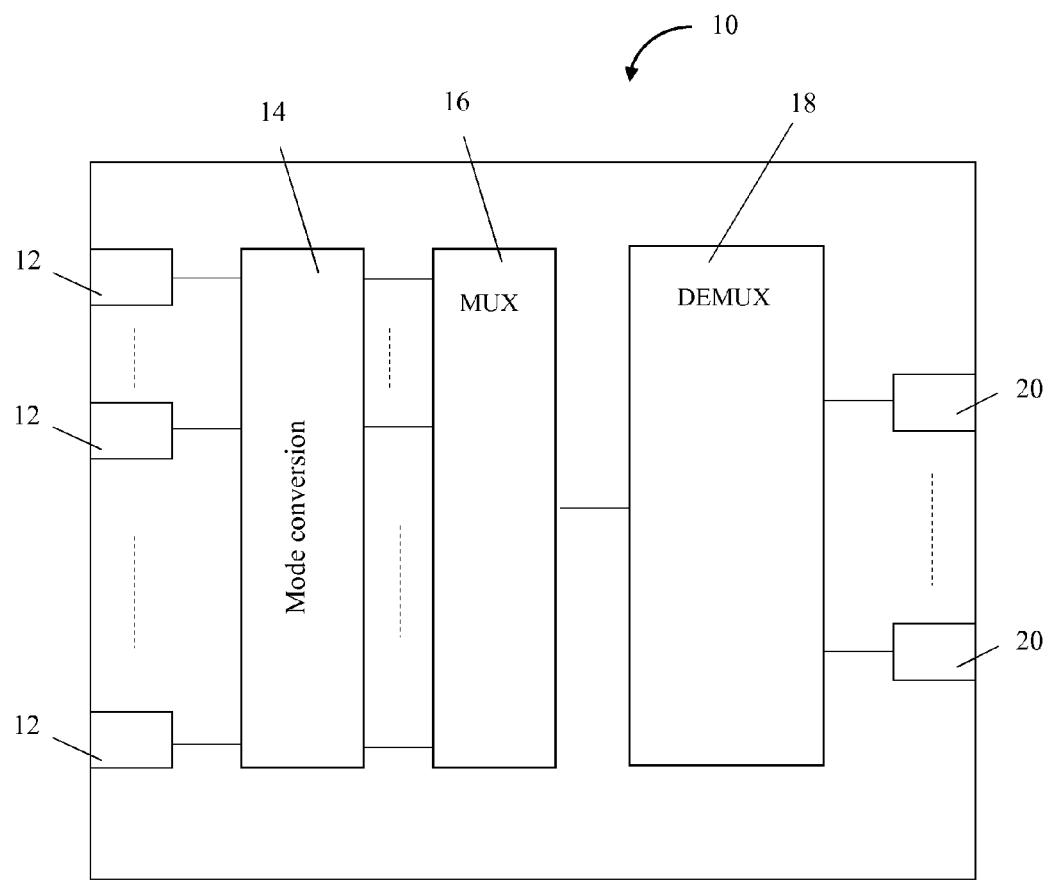
FIG. 1 is a schematic representation of an optical switch according to a first embodiment of the invention.

Referring to FIG. 1, a first embodiment of the invention provides an optical switch 10 comprising a plurality of inputs 12, mode conversion apparatus 14, optical multiplexing apparatus 16 and optical demultiplexing apparatus 18.

Each input 12 is arranged to receive a respective input optical signal at one of a plurality of wavelengths. Each input optical signal has a respective planar wavefront.

The conversion apparatus 14 is arranged to receive each input optical signal and is arranged to convert each input optical signal into a respective optical signal having a respective one of a plurality of helical wavefronts. Each helical wavefront has a different shape and thus has a different orbital angular momentum, OAM. A helical wavefront gives the optical signal an OAM and a generally ring-shaped transverse intensity profile. Each different shaped helical wavefront has a different OAM and a different ring-shaped intensity profile, and is referred to as an OAM mode.

A wavefront is the locus of points on a wave having the same phase. For an optical signal having planar wavefront, such as a laser beam, the locus of points having the same phase is a planar surface. A planar wavefront of an optical beam has a wavevector (a vector which points in the direction in which the wave propagates) which is parallel to the axis of the beam. For an optical beam with a helical wavefront the locus of points having the same phase is a helical surface and the wavevector spirals around the beam axis. An optical beam with OAM of $lh/2\pi$, where h is the Plank constant and l is an integer, has an azimuthal phase term $\exp(il\theta)$, where $\theta$ is the azimuthal angle. Examples of a planar wavefront, a helical wavefront and the transverse intensity profiles of each, together with details of how a helical wavefront gives rise to orbital angular momentum in an optical signal are given in M. Padgett and L. Allen, "Light with a twist in its tail", Contemporary Physics, 2000, volume 41, number 5, pages 275-285.

The optical multiplexing apparatus 16 is arranged to receive each helical wavefront optical signal from the conversion apparatus and is arranged to multiplex the helical wavefront optical signals into an OAM multiplexed optical signal. The OAM multiplexed optical signal has a transverse intensity profile which consists of a series of rings. Beams with different OAM are orthogonal, i.e. they can propagate together without crosstalk.

The optical demultiplexing apparatus 18 comprises a plurality of outputs 20. The optical demultiplexing apparatus is arranged to receive the OAM multiplexed optical signal and demultiplex it into a plurality of wavelength division multiplexed, WDM, optical signals. Each WDM optical signal has a different OAM, that is to say each WDM optical signal is comprised of a plurality of optical signals each having a different wavelength but all having the same helical wavefront shape. The demultiplexing apparatus 18 is arranged to reconvert each WDM optical signal from its helical wavefront into a respective planar wavefront. The demultiplexing apparatus 18 is arranged to deliver each Gaussian mode WDM optical signal to a respective one of the outputs according to the OAM the WDM optical signal had before reconversion to a Gaussian mode.

Figure 2:
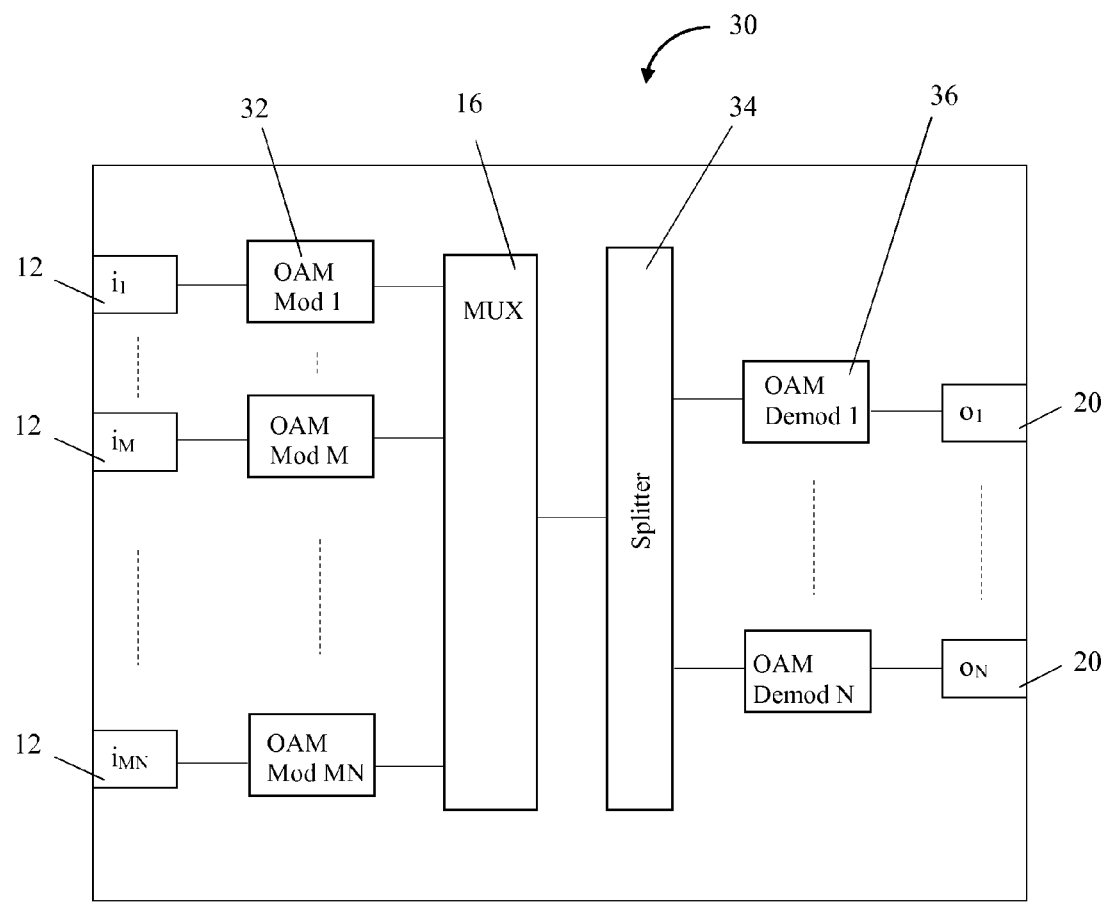
FIG. 2 is a schematic representation of an optical switch according to a second embodiment of the invention.

A second embodiment of the invention provides an optical switch 30 as shown in FIG. 2. The optical switch of this embodiment is similar to the optical switch 10 of FIG. 1, with the following modifications. The same reference numbers are retained for corresponding features.

In this embodiment, the mode conversion apparatus comprises a plurality of OAM modulators 32 and the optical demultiplexing apparatus comprises optical splitting apparatus 34 and a plurality of orbital angular momentum demodulators 36.

Each OAM modulator 32 is arranged to receive a respective input optical signal and is arranged to convert the input optical signal from its planar wavefront into one of the plurality of helical wavefronts.

The optical splitting apparatus 34 is arranged to receive the OAM multiplexed optical signal and is arranged to split it into a plurality of replica OAM multiplexed optical signals. The optical splitting apparatus 34 may be a passive optical splitter.

The OAM demodulators 36 are each coupled to a respective output 20 of the optical switch. The OAM demodulators are each arranged to receive a respective one of the replica OAM multiplexed optical signals. Each OAM demodulator is arranged to reconvert optical signals having a respective preselected one of the helical wavefronts, i.e. a respective preselected OAM, into a WDM optical signal having a respective planar wavefront. Each replica OAM multiplexed optical signal may comprise optical signals at all of the helical wavefront shapes, i.e. all of the OAMs, but each OAM demodulator reconverts optical signals having only a respective one of the helical wavefront shapes, i.e. only one respective preselected OAM, and filters out optical signals at the other helical wavefront shapes. Each OAM demultiplexer reconverts a different one of the helical wavefront shapes. The resulting planar wavefront WDM optical signal is then delivered to the respective output.

In this embodiment, each input optical signal has a Hermite-Gaussian transverse mode. Each OAM modulator 32 and each OAM demodulator 36 comprises a spiral phase mask, which is implemented using a spatial light modulator, SLM. An SLM can be programmed to select the spiral phase mask that it will apply, and thus the helical wavefront that the OAM modulator or demodulator will convert to or from.

Each input optical signal is an information carrying optical signal and has one of an amplitude modulation format and a phase modulation format.

A third embodiment of the invention provides an optical switch having the structure shown in FIG. 2. In this embodiment, each input optical signal has a respective spin angular momentum. Each OAM modulator converts the spin angular momentum into a corresponding orbital angular momentum. The method as described by Lorenzo Marrucci in "Rotating light with light: Generation of helical modes of light by spin-to-orbital angular momentum conversion in inhomogeneous liquid crystals", Proc. SPIE 6587, Liquid Crystals and Applications in Optics, 658708 (May 9, 2007), may be used.

A fourth embodiment of the invention provides an optical switch having the structure shown in FIG. 2. In this embodiment, each input optical signal has a transverse electric, TE, mode. Each OAM modulator combines the input optical signal with another optical signal having a transverse magnetic, TM, mode to form the helical wavefront optical signals, each having a different orbital angular momentum. The method described by D. Zhang et al., "Generating in-plane optical angular momentum beams with silicon waveguides", IEEE Photonics Journal, vol. 5, no. 2, 2013, may be used.

Alternatively, an input optical signal may have a TM mode and be combined with another optical signal having a TE mode to form an optical signal having an OAM.

A fifth embodiment of the invention provides an optical switch having the structure shown in FIG. 2. In this embodiment, each OAM modulator comprises a diffractive element which applies a diffraction pattern, which may be referred to as a 'hologram', to the respective input optical signal to it into a respective optical signal having a helical wavefront. The method described by M. Padgett and L. Allen, "Light with a twist in its tail", Contemporary Physics, 2000, volume 41, number 5, pages 275-285, may be used.

A sixth embodiment of the invention provides a method 40 of switching optical signals. The method 40 has the steps shown in FIG. 3 and comprises receiving a plurality of input optical signals 42. Each input optical signal has one of a plurality of wavelengths and a respective planar wavefront. Each input optical signal is converted from its planar wavefront into one of a plurality of helical wavefronts 44, each having a different OAM and referred to as different OAM modes. Following conversion, the resulting helical wavefront optical signals are multiplexed into an OAM multiplexed optical signal 46. The OAM multiplexed optical signal is then demultiplexed into a plurality of WDM optical signals each having a different OAM 48 and each WDM optical signal is reconverted from its helical wavefront into a respective planar wavefront 50.

Input optical signals having different wavelengths but sharing a common destination can therefore be switched by assigning them the same OAM.

Figure 3:
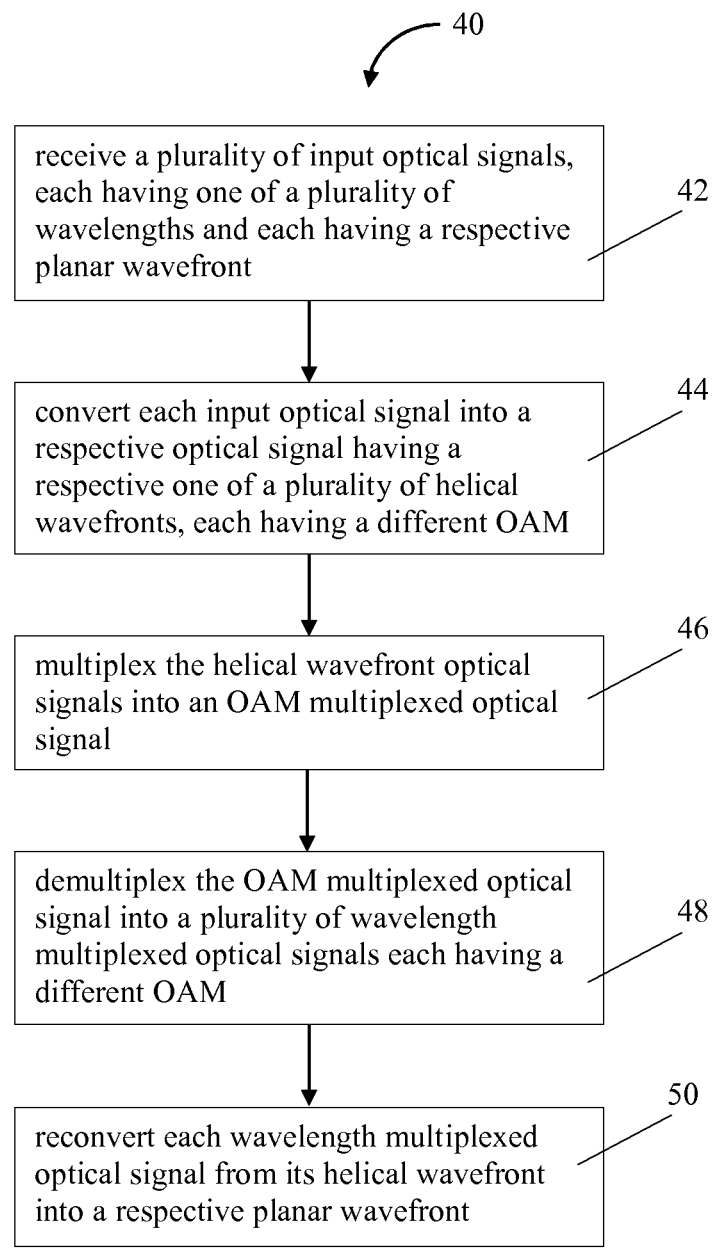
FIG. 3 shows the steps of a method of switching optical signals according to a sixth embodiment of the invention.
Figure 4:
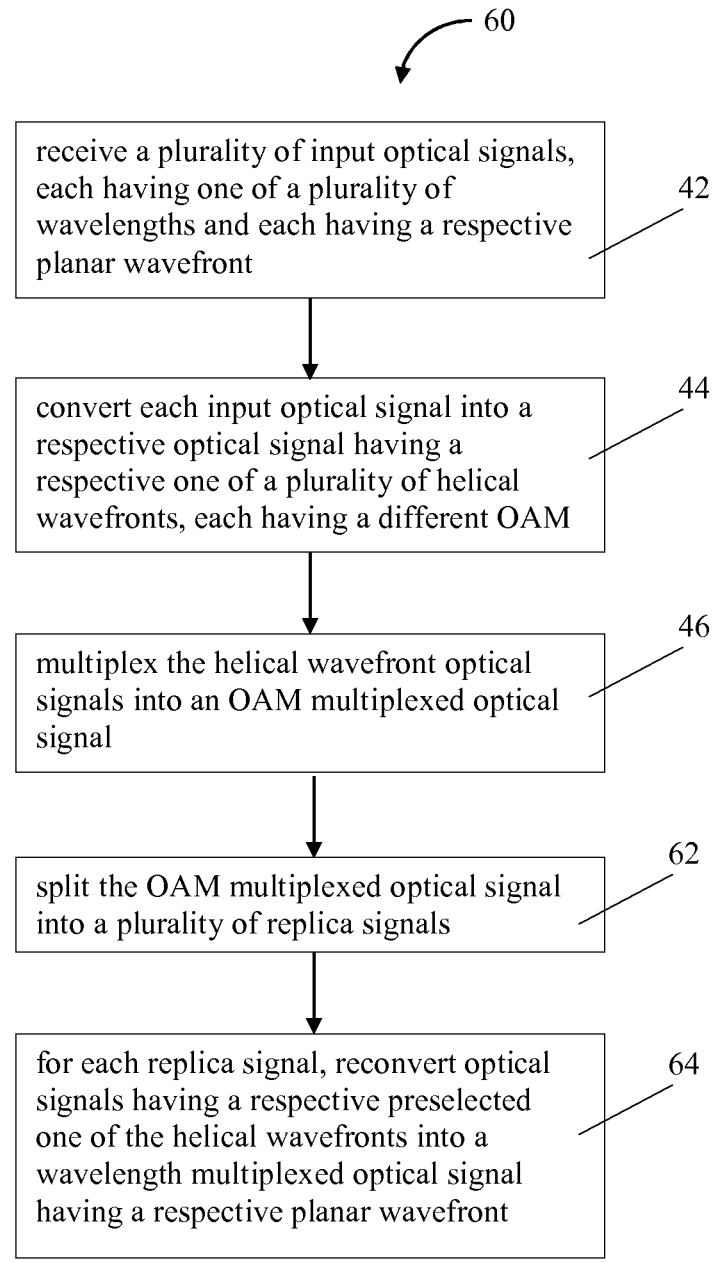
FIG. 4 shows the steps of a method of switching optical signals according to a seventh embodiment of the invention.

The steps of a method 60 of switching optical signals according to a seventh embodiment of the invention are shown in FIG. 4. The method 60 of this embodiment is similar to the method 40 shown in FIG. 3, with the following modifications. The same reference numbers are retained for corresponding steps.

In this embodiment, the OAM multiplexed optical signal is demultiplexed by splitting it into a plurality of replica signals 62 and then, for each replica signal, reconverting a respective preselected one of the helical wavefronts, that is all of the optical signals having the same helical wavefront shape, into a WDM optical signal having a respective planar wavefront 64.

In this embodiment, each input optical signal has a Hermite-Gaussian transverse mode and each input optical signal is converted from its planar wavefront into one of the helical wavefronts by applying a respective spiral phase mask to the input optical signal. The input Hermite-Gaussian transverse mode optical signal has a planar wavefront. The input optical signal is transmitted through a spiral phase mask, converting the planar wavefront into a helical wavefront, thereby giving the input optical signal an OAM. A different spiral phase mask is applied to each input optical signal, thereby forming a different shaped helical wavefront having a different OAM for each input optical signal.

The OAM multiplexed optical signals are demodulated by applying a spiral phase mask to each OAM multiplexed optical signal. Each OAM multiplexed optical signal is transmitted through a different spiral phase mask, thereby reconverting a different one of the helical wavefronts. Each helical wavefront is thus converted back into a corresponding planar wavefront.

Each input optical signal is an information carrying optical signal and has one of an amplitude modulation format and a phase modulation format.

An eighth embodiment of the invention provides a method of switching optical signals having the steps shown in FIG. 3. In this embodiment, each input optical signal has a respective spin angular momentum. The spin angular momentum of each input optical signal is converted into a corresponding orbital angular momentum. The method as described by Lorenzo Marrucci in "Rotating light with light: Generation of helical modes of light by spin-to-orbital angular momentum conversion in inhomogeneous liquid crystals", Proc. SPIE 6587, Liquid Crystals and Applications in Optics, 658708 (May 9, 2007), may be used.

A ninth embodiment of the invention provides a method of switching optical signals having the steps shown in FIG. 3. In this embodiment, each input optical signal has a transverse electric, TE, mode. The input optical signal is combined with another optical signal having a transverse magnetic, TM, mode to form a helical wavefront optical signal, each helical wavefront optical signals having a different orbital angular momentum. The method described by D. Zhang et al., "Generating in-plane optical angular momentum beams with silicon waveguides", IEEE Photonics Journal, vol. 5, no. 2, 2013, may be used.

Alternatively, the input optical signal may have a TM mode and be combined with another optical signal having a TE mode to form an optical signal having an OAM.

A tenth embodiment of the invention provides a method of switching optical signals having the steps shown in FIG. 3. In this embodiment, each input optical is transmitted through a diffractive element which applies a diffraction pattern, which may be referred to as a 'hologram', to the input optical signal to convert it into a respective optical signal having a helical wavefront. The method described by M. Padgett and L. Allen, "Light with a twist in its tail", Contemporary Physics, 2000, volume 41, number 5, pages 275-285, may be used.

An eleventh embodiment of the invention provides a method of switching optical signals which is similar to either of the previous methods 40, 60 and will be described with reference to FIGS. 3 and 4.

In this embodiment, the method commences with receiving a plurality of WDM input optical signals. Each WDM input optical signal is demultiplexed into a plurality of input optical signals each having a different one of the plurality of wavelengths and having a planar wavefront.

Figure 5:
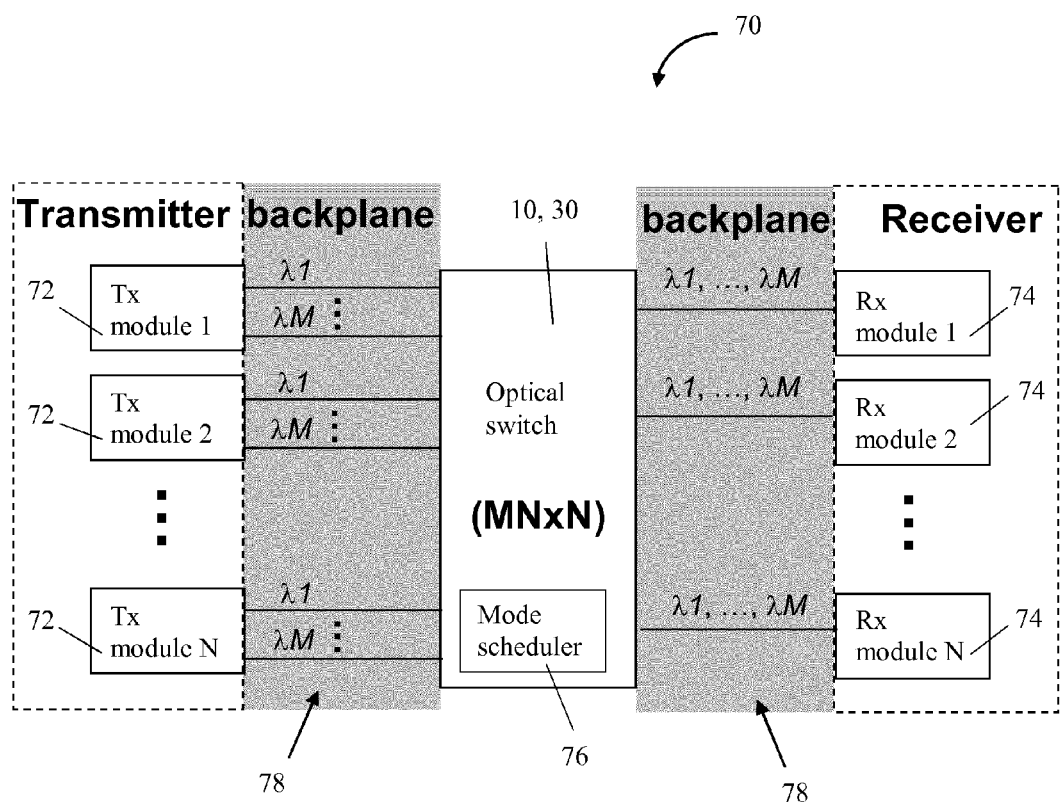
FIG. 5 is a schematic representation of an optical interconnection network according to a twelfth embodiment of the invention.
Figure 7:
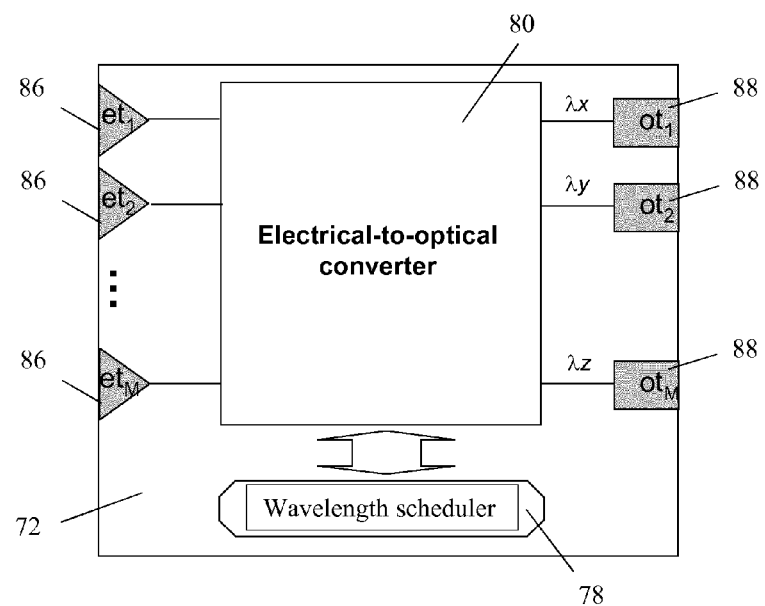
FIG. 7 is a schematic representation of a transmitter module of FIG. 5 or FIG. 6.
Figure 8:
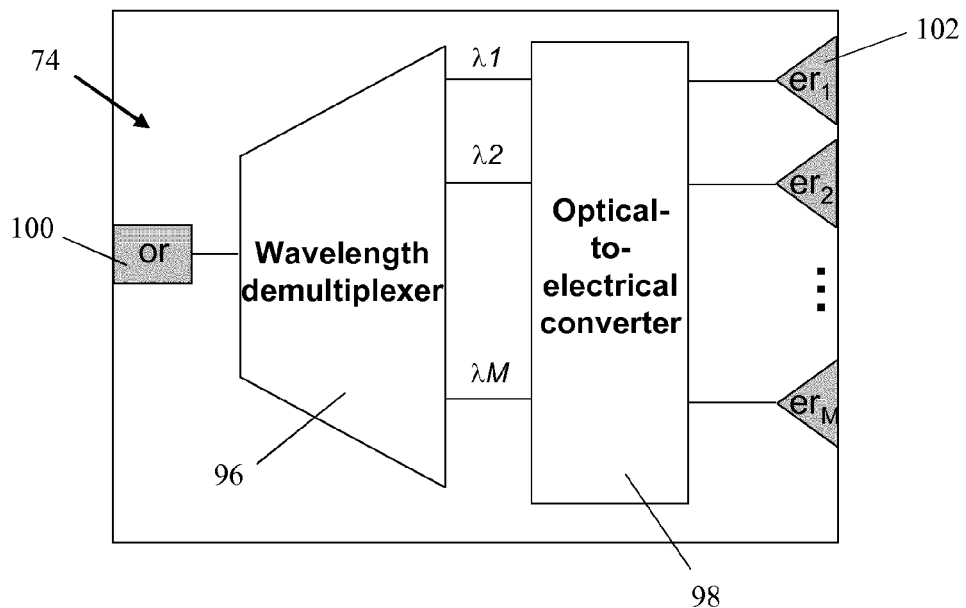
FIG. 8 is a schematic representation of a receiver module of FIG. 5 or FIG. 6.

A twelfth embodiment of the invention provides an optical interconnection network 70, as shown in FIGS. 5, 7 and 8. The optical interconnection network 70 comprises an optical switch 10, 30, as shown in FIG. 1 or FIG. 2, a plurality, N, of transmitter, Tx, modules 72, a plurality, N, of receiver, Rx, modules 74 and a mode scheduler 76.

Each optical transmitter module 72, shown in FIG. 7, is arranged to receive input electrical signals at its inputs 86. The input electrical signals carry data cells to be transmitted across the interconnection network. Each transmitter module also comprises a wavelength scheduler 78, an electrical-to-optical, E-O, converter 80, and a plurality of optical outputs 88. The wavelength scheduler of each transmitter module is arranged to assign one of a plurality, M, of wavelengths to each input electrical signal. Each E-O converter 80 is arranged to convert each input electrical signal into an input optical signal at the respective assigned wavelength and having a respective planar wavefront. The optical switch 10, 30 is arranged to receive up to MN input optical signals from the optical transmitter modules 72 and is arranged to output N planar wavefront WDM optical signals.

The optical receiver modules 74, shown in FIG. 8, each comprise an optical input 100 arranged to receive a respective planar wavefront WDM optical signal from a respective output of the optical demultiplexing apparatus 18, 36 of the optical switch. Each optical receiver module 74 comprises a wavelength demultiplexer 96, an optical-to-electrical, O-E, converter 98 and a plurality of electrical output ports 102.

The wavelength demultiplexers 96 are arranged to demultiplex the respective planar wavefront WDM optical signal into a plurality of output optical signals each at one of the plurality of wavelengths. The O-E converter 98 is arranged to convert each output optical signal into a respective output electrical signal. Each electrical output port 102 is arranged to output electrical signals converted from output optical signals at a respective one of the plurality of wavelengths.

The mode scheduler 76 is arranged to assign one of the plurality of OAMs to each input optical signal received at the mode conversion apparatus. The mode scheduler is arranged to generate and transmit to the mode conversion apparatus at least one conversion control signal 94. The conversion control signal is arranged to cause the conversion apparatus to convert each input optical signal from its planar wavefront into a respective helical wavefront having the corresponding assigned OAM.

The transmitter modules 72 and the receiver modules 74 are connected to the optical switch 10, 30 by an optical backplane 78.

Figure 6:
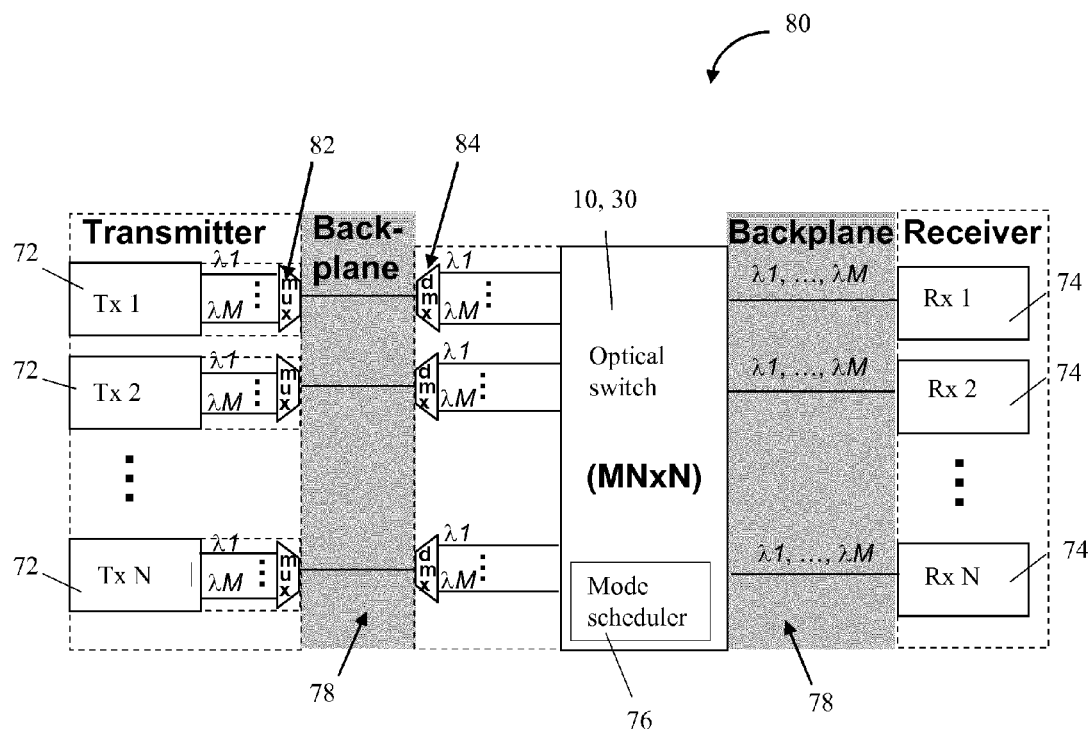
FIG. 6 is a schematic representation of an optical interconnection network according to a thirteenth embodiment of the invention.

A thirteenth embodiment of the invention provides an optical interconnection network 80, as shown in FIGS. 6 to 8. The optical interconnection network 80 of this embodiment is similar to the optical interconnection network 70 shown in FIG. 5, with the following modifications. The same reference numbers are retained for corresponding features.

In this embodiment, each transmitter module 72 further comprises a wavelength multiplexer, MUX 82, arranged to receive the input optical signals from E-O converter 80 and arranged to multiplex the input optical signals into a WDM input optical signal. Each transmitter module therefore outputs a single WDM optical signal, for transmission across the backplane 78 to the optical switch 10, 30.

The optical switch further comprises a plurality of wavelength division demultiplexers, DMX 84, each arranged to receive a respective WDM input optical signal and each arranged to demultiplex each WDM input optical signal into a plurality of input optical signals. Each of the demultiplexed input optical signals have a different one of the plurality of wavelengths, M. The outputs of the demultiplexers are connected to respective ones of the inputs of the optical switch, so each input optical signal is delivered to a respective input.

Figure 9:
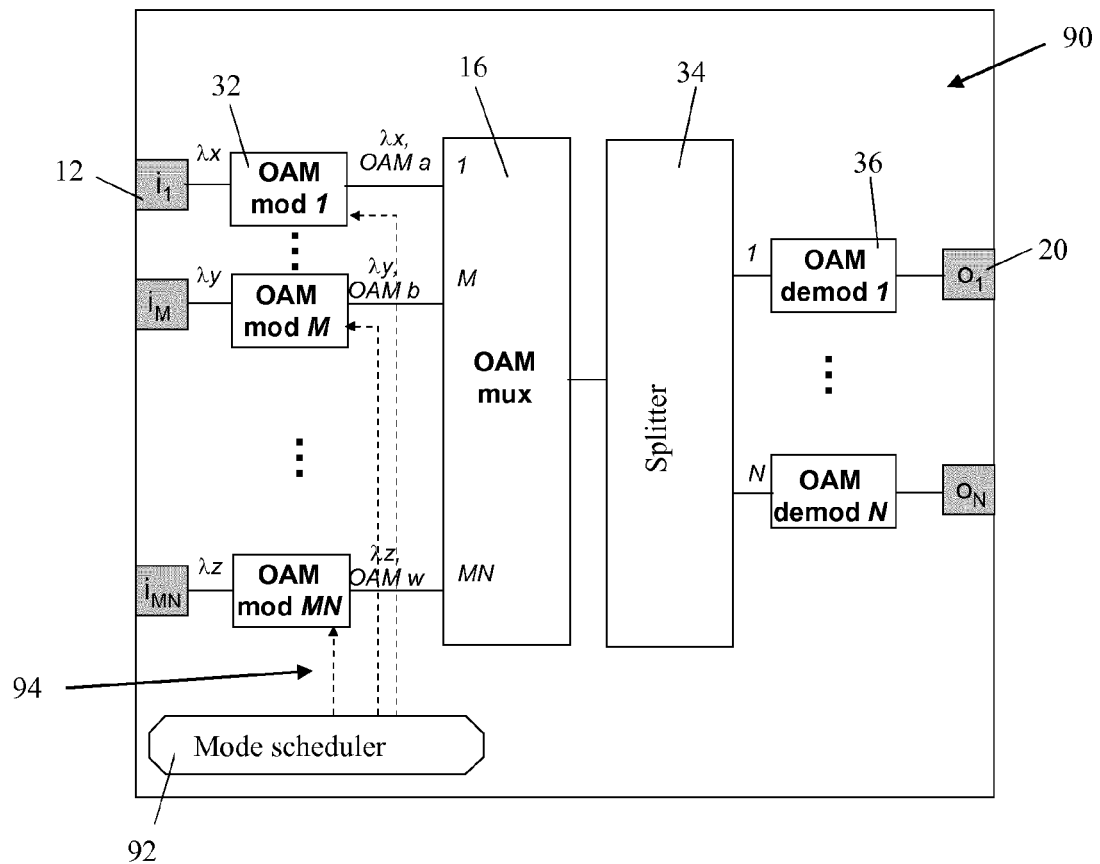
FIG. 9 is a schematic representation of an optical switch according to a fourteenth embodiment of the invention, for use in the interconnection network of FIG. 5 or FIG. 6.

FIG. 9 shows an optical switch 90 of an optical interconnection network according to a fourteenth embodiment of the invention. The optical interconnection network of this embodiment has the same structure as the either of the optical interconnection networks 70, 80 of FIGS. 5 and 6. The optical switch 90 is similar to the optical switch of FIG. 2. The same reference numbers are retained for corresponding features.

In this embodiment, the optical interconnection network has the same number of optical receiver modules 74 as there are OAM modes and each optical receiver module has the same number of electrical output ports as the number of wavelengths.

The mode scheduler 92 is arranged to receive wavelength assignment information from the wavelength scheduler 78 of each transmitter module 72 for a preselected time window. The mode scheduler is arranged to interrogate the wavelength assignment information received from each transmitter module 72 for each input electrical signal, together with the OAM assigned by the wavelength scheduler to each input optical signal. The mode scheduler is arranged to identify any input optical signals having the same wavelength and OAM. The mode scheduler is arranged to, where two or more input optical signals are identified as having the same OAM and the same wavelength, meaning that they will be switched to the same electrical output port of the same receiver module and thus cause a contention, select a different OAM for at least one of the identified input optical signals, so each input optical signal has a different wavelength or a different OAM.

The mode scheduler 92 may communicate with the wavelength schedulers 78 to implement the two-step scheduling framework as described in WO2010/072247.

In this embodiment, a plurality, N, of transmitter modules 72 are connected to a corresponding plurality, N, of receiver modules 74 through an MN×N optical switch 90. In FIG. 5, each transmitter module is connected to the optical switch through a plurality, M, of optical connections in the optical backplane, corresponding to the number of optical outputs 88, each one carrying an optical signal of a different wavelength. In the alternative embodiment, shown in FIG. 6, all the optical signals, at each of the M wavelengths, output from each transmitter module 74 are multiplexed into a single output line, thus reducing the number of the optical connections to the optical switch down to N. The optical switch is connected to the receiver modules 74 with N optical connections. The optical connections between the transmitter modules and receiver modules and the optical switch, the optical backplane, can be implemented in freespace, with optical fibres or through integrated optical wires in case of short-range interconnections.

Each transmitter module 72 has a plurality, M, of electrical inputs 86 each arranged to receive electrical signals carrying the data cells (packets) to be transmitted across the optical interconnection network. Each electrical input signal is fed into E-O converter 80 which converts each electrical signal into an optical signal having a planar wavefront, in this example with a Hermite-Gaussian transverse intensity profile, referred to as a 'Gaussian mode', at an assigned wavelength which is different for each electrical input. The wavelength scheduler, which may be referred to as an intra-module scheduler, is the electronic circuit responsible for the wavelength assignment. The plurality of wavelengths, M, corresponds to the number of electrical output ports 102 of each receiver module 74.

At each time slot, packets are selected from the electrical inputs 86 and sent to the E-O converter 80, which directs the packets to the respective optical modulators associated to the optical source operating at the assigned wavelengths. The selection of the modulators is performed according to the destination output port 102 of each packet. The modulated optical signals are then sent to the optical outputs 88. Each input optical signal is an information carrying optical signal and has one of an amplitude modulation format and a phase modulation format applied to it by the respective optical modulator.

In the optical interconnection network of FIG. 5, the optical outputs 88 of each of the N transmitter modules 72 carry M optical signals at M different wavelengths, which are sent to the MN×N optical switch 90. Each of the NM input optical signals received from the transmitter modules 72 are received by a respective OAM modulator 32.

In the optical interconnection network of FIG. 6, to reduce the number of optical outputs 88 at each transmitter module 72 from M down to one, the M optical signals output from the E-O converter are multiplexed by the optical multiplexer 82. This can be done because each output 88 outputs optical signals at a different wavelength. Just N WDM input optical signals are received at the optical switch 90. The wavelength demultiplexers 84 separate the WDM input optical signals into a plurality of optical signals, each having a different on of the plurality, M, of wavelengths, which are sent to a corresponding number of OAM modulators.

Each OAM modulator converts the respective input optical signal into a respective optical signal having a respective helical wavefront. Each helical wavefront has a different OAM chosen from a fixed set of N OAM values. Each OAM identifies the destination receiver module 74. Each OAM modulator operates independently of the wavelength of the input optical signal, i.e. each OAM modulator can impose each of the N OAMs on each of the possible M input wavelengths. Each OAM modulator is driven by the mode scheduler 92, which assigns an OAM to each of the MN input optical signals. The helical wavefront optical signals at the output of the OAM modulators are fed to the OAM multiplexer 16 which multiplexes all the MN helical wavefront optical signals.

In order to avoid contentions, signals with the same OAM, i.e. directed to the same receiver module 74, must have different wavelength, i.e. must be directed to a different electrical output port 102. The OAM multiplexed optical signal is then transmitted to the OAM demultiplexer (optical splitter 34 and OAM demodulators 36) which separates the optical signals according to their OAM. The OAM demultiplexer has N output ports 20, each one connected to one of the receiver modules 74. It is worth noting that the OAM demultiplexer receives up to MN signals as a single OAM multiplexed optical signal, and simultaneously directs all the optical signals having the same OAM to the same output 20. Each OAM demodulator 36 converts the input helical wavefront for each OAM to a corresponding planar wavefront, keeping the wavelength of each optical signal unchanged. Each OAM demodulator can demodulate M optical signals at M different wavelengths at the same time, thus only a single OAM demodulator is required for each receiver module.

Since helical wavefronts, OAM modes, are orthogonal, in principle an infinite number of different OAMs can be adopted, thus enabling high scalability for the interconnection network. The optical switch 90 can be therefore implemented with a high number of outputs 20 in order to leave space for future network expansion requiring additional transmitter modules and receiver modules.

Figure 10:
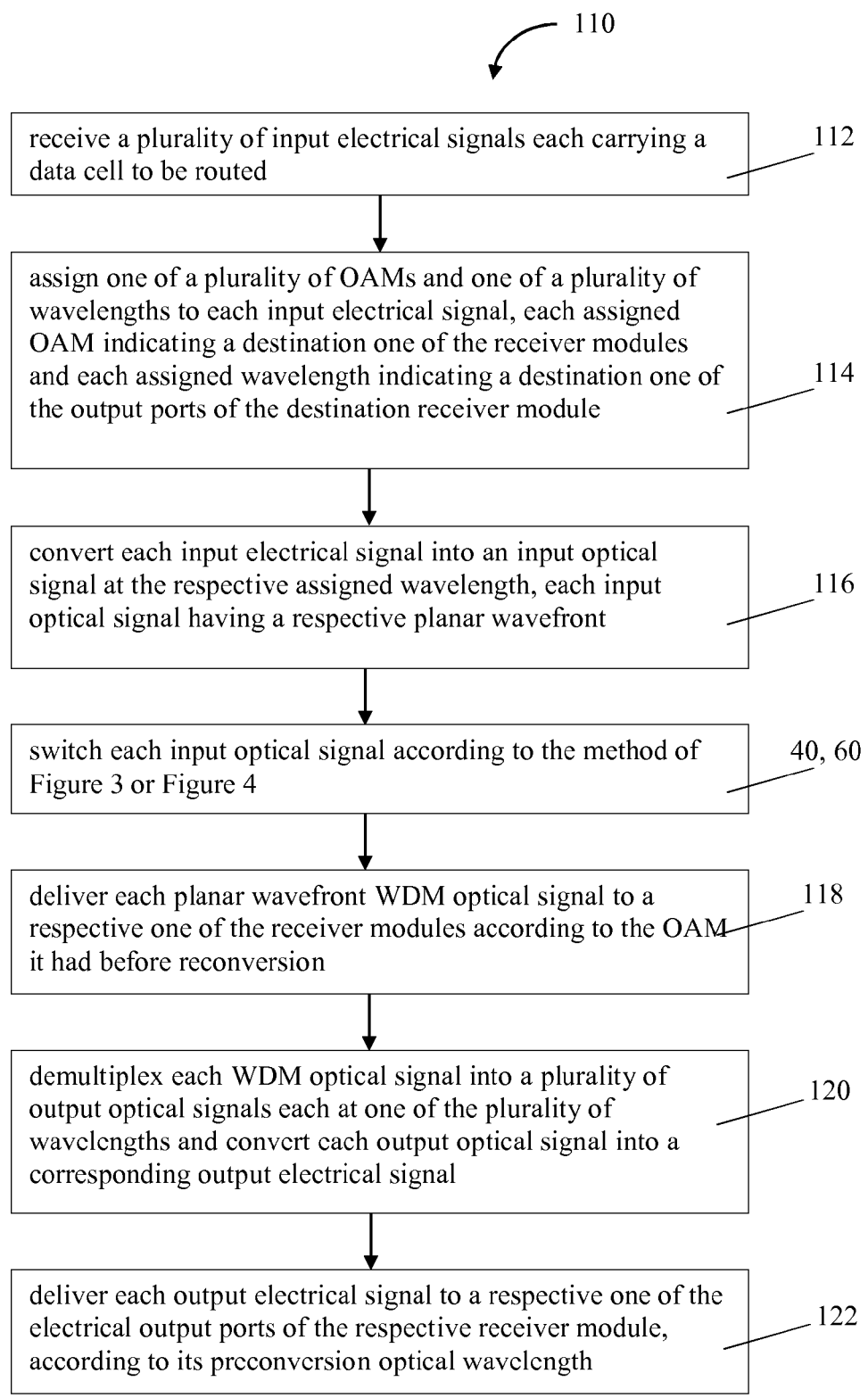
FIG. 10 shows the steps of a method of routing data cells across an optical interconnection network according to a fifteenth embodiment of the invention.

A fifteenth embodiment of the invention provides a method 110 of routing data cells across an optical interconnection network from a respective electrical input port of a respective transmitter module to a respective one of a plurality of electrical output ports of a plurality of receiver modules. The method 110 has the steps shown in FIG. 10.

The method 110 comprises receiving a plurality of input electrical signals each carrying a data cell to be routed 112. An OAM, selected from a fixed set of OAM values, and one of a plurality of wavelengths is assigned to each input electrical signal 114. Each OAM specifies the destination receiver module and each assigned wavelength specifies the destination output port of the destination receiver module.

The method 110 comprises converting each input electrical signal into an input optical signal at the respective assigned wavelength 116. Each input optical signal has a respective planar wavefront.

Each input optical signal is switched according to the method 40, 60 of switching an optical signal described in FIG. 3 or FIG. 4. Each planar wavefront WDM optical signal is delivered to a respective one of the receiver modules according to the OAM it had before reconversion 118.

Each WDM optical signal is demultiplexed into a plurality of output optical signals each at one of the plurality of wavelengths. Each output optical signal is then converted into a corresponding output electrical signal 120. Each output electrical signal is delivered to a respective one of the electrical output ports of the respective receiver module, according to its preconversion optical wavelength 122.

A sixteenth embodiment of the invention provides a method 130 of routing data cells across an optical interconnection network from a respective electrical input port of a respective transmitter module to a respective one of a plurality of electrical output ports of a plurality of receiver modules. The method 130 has the steps shown in FIG. 11. The method 130 of this embodiment is similar to the method 110 of FIG. 10, with the following modifications. The same reference numbers are retained for corresponding steps.

In this embodiment, the OAMs and the wavelengths are assigned to the input electrical signals such that input electrical signals assigned the same OAM are each assigned a different one of the plurality of wavelengths 132.

Each input optical signal is an information carrying optical signal carrying the respective data cell. Each input optical signal has one of an amplitude modulation format and a phase modulation format.

Each input electrical signal is converted into an input optical signal at the respective assigned wavelength by modulating an optical signal having the assigned wavelength to form the information carrying input optical signal. An amplitude modulation or a phase modulation, such as 16-quadrature amplitude modulation, 16-QAM, is applied to the optical signal to form the information carrying input optical signal.

In this embodiment, each input optical signal has a Hermite-Gaussian transverse mode with a planar wavefront. Each input optical signal is transmitted through a respective spiral phase mask, converting the planar wavefront into a helical wavefront, thereby giving the input optical signal an OAM. A different spiral phase mask is used for each input optical signal, thereby giving each input optical signal a different helical wavefront having a different OAM.

The OAM demodulation comprises transmitting each OAM multiplexed optical signal through a respective spiral phase mask, which acts to convert a respective one of the helical wavefront shapes back into a corresponding planar wavefront.

The spiral phase masks may be implemented as spatial light modulators.

Figure 11:
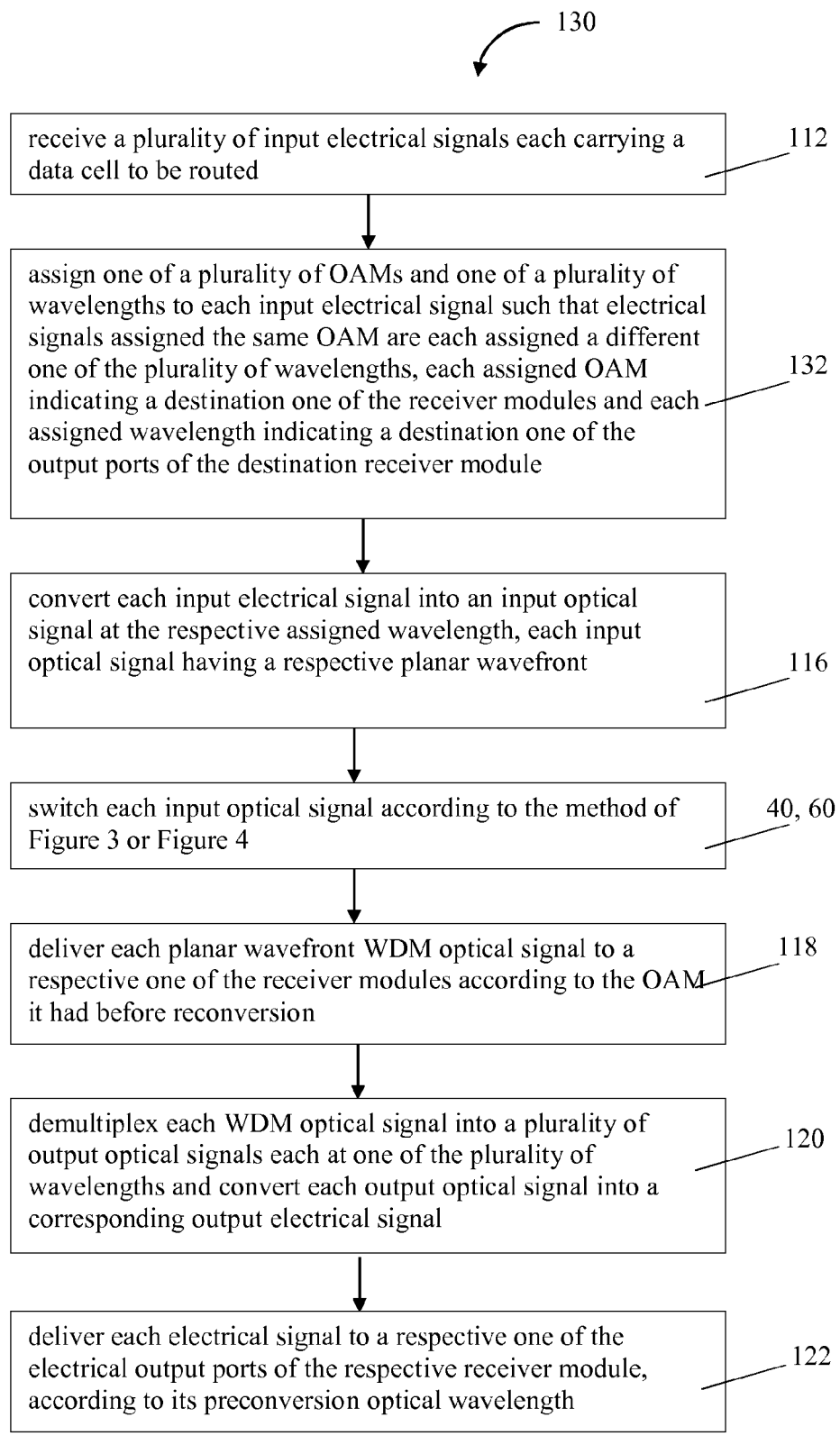
FIG. 11 shows the steps of a method of routing data cells across an optical interconnection network according to a sixteenth embodiment of the invention.
Figure 12:
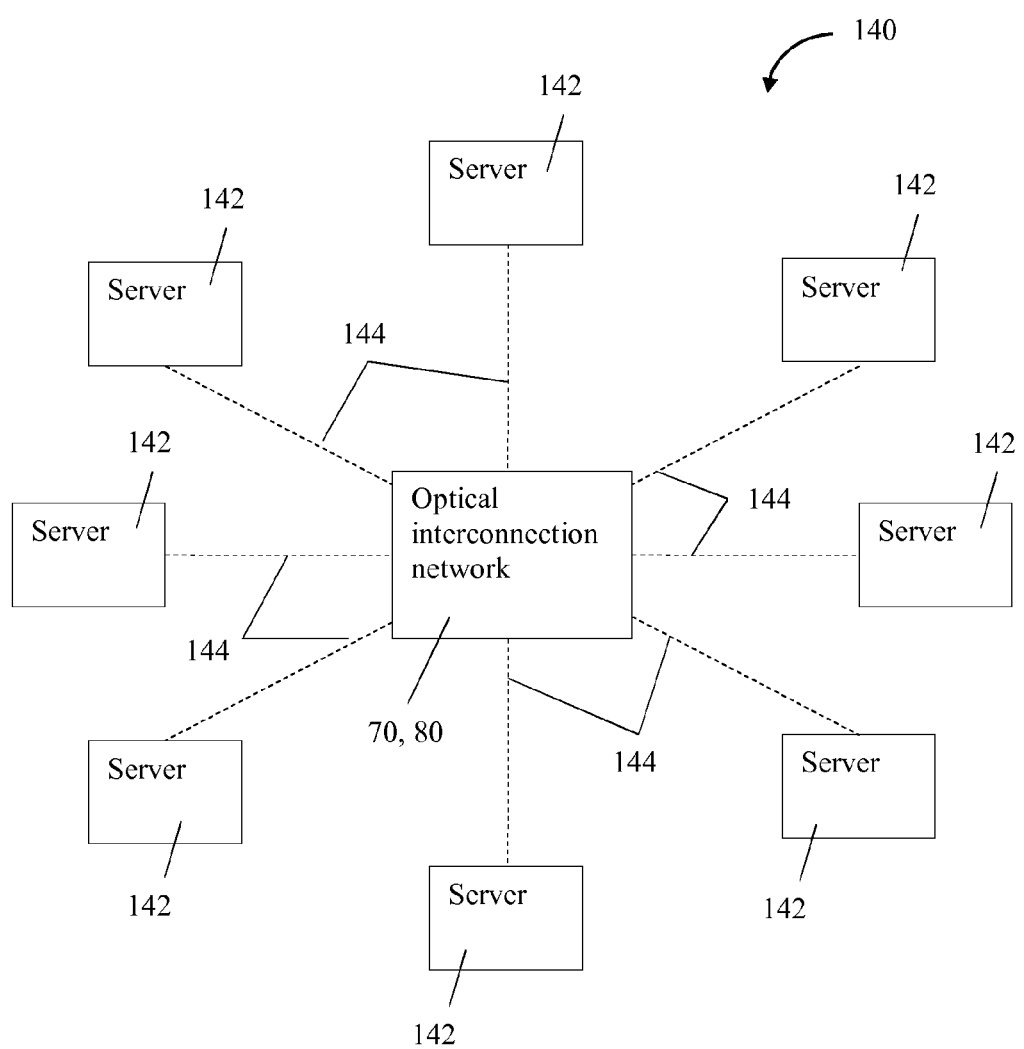
FIG. 12 is a schematic representation of a data centre according to a twentieth embodiment of the invention.

A seventeenth embodiment of the invention provides a method of routing data cells across an optical interconnection network having the steps shown in FIG. 11. In this embodiment, each input optical signal has a respective spin angular momentum. The spin angular momentum of each input optical signal is converted into a corresponding orbital angular momentum. The method as described by Lorenzo Marrucci in "Rotating light with light: Generation of helical modes of light by spin-to-orbital angular momentum conversion in inhomogeneous liquid crystals", Proc. SPIE 6587, Liquid Crystals and Applications in Optics, 658708 (May 9, 2007), may be used.

An eighteenth embodiment of the invention provides a method of routing data cells across an optical interconnection network having the steps shown in FIG. 11. In this embodiment, each input optical signal has a transverse electric, TE, mode. The input optical signal is combined with another optical signal having a transverse magnetic, TM, mode to form a helical wavefront optical signal, each helical wavefront optical signals having a different orbital angular momentum. The method described by D. Zhang et al., "Generating in-plane optical angular momentum beams with silicon waveguides", IEEE Photonics Journal, vol. 5, no. 2, 2013, may be used.

Alternatively, the input optical signal may have a TM mode and be combined with another optical signal having a TE mode to form an optical signal having an OAM.

A nineteenth embodiment of the invention provides a method of routing data cells across an optical interconnection network having the steps shown in FIG. 11. In this embodiment, each input optical is transmitted through a diffractive element which applies a diffraction pattern, which may be referred to as a 'hologram', to the input optical signal to convert it into a respective optical signal having a helical wavefront. The method described by M. Padgett and L. Allen, "Light with a twist in its tail", Contemporary Physics, 2000, volume 41, number 5, pages 275-285, may be used.

A twentieth embodiment of the invention provides a data centre 140 comprising a plurality of computer servers 142, an optical interconnection network 70, 80, and a plurality of communication links 144 each connecting a respective server to the optical interconnection network.

The optical interconnection network 70, 80 is as described in any of FIGS. 5 to 9.

A twenty-first embodiment of the invention provides a data carrier having computer readable instructions embodied therein, the computer readable instructions being for providing access to resources available on a processor. The computer readable instructions comprise instructions to cause the processor to perform the method of switching optical signals as described in any of the third to the fifth embodiments described above.

The data carrier may be a non-transitory data carrier.

A twenty-second embodiment of the invention provides a data carrier having computer readable instructions embodied therein, the computer readable instructions being for providing access to resources available on a processor. The computer readable instructions comprising instructions to cause the processor to perform the method of routing data cells across an optical interconnection network from a respective electrical input port of a respective transmitter module to a respective one of a plurality of electrical output ports of a plurality of receiver modules as described in the ninth or tenth embodiment described above.

The data carrier may be a non-transitory data carrier.

The invention claimed is:
1. An optical switch comprising:
a plurality of inputs, each arranged to receive a respective input optical signal at one of a plurality of wavelengths and having a respective planar wavefront;
converter arranged to receive each input optical signal and arranged to convert each input optical signal into a respective optical signal having a respective one of a plurality of helical wavefronts, each helical wavefront having a different orbital angular momentum;
optical multiplexer arranged to receive each helical wavefront optical signal from the converter and arranged to multiplex the helical wavefront optical signals into an orbital angular momentum multiplexed optical signal; and
optical demultiplexer comprising a plurality of outputs, the optical demultiplexer arranged to: receive the orbital angular momentum multiplexed optical signal; demultiplex the orbital angular momentum multiplexed optical signal into a plurality of wavelength multiplexed optical signals each having a different one of the orbital angular momenta;
reconvert each wavelength multiplexed optical signal from its helical wavefront into a respective planar wavefront; and deliver each planar wavefront wavelength multiplexed optical signal to a respective one of the outputs according to the respective orbital angular momentum it had before reconversion;
wherein the optical demultiplexer further comprises:
an optical splitter arranged to receive the orbital angular momentum multiplexed optical signal and arranged to split it into a plurality of replica signals; and
a plurality of orbital angular momentum demodulators each coupled to a respective output and arranged to receive a respective one of the replica orbital angular momentum multiplexed optical signals and each arranged to reconvert optical signals having a respective preselected one of the helical wavefronts into a wavelength multiplexed optical signal having a respective planar wavefront and to deliver the reconverted wavelength multiplexed optical signal to its output.

2. An optical switch as claimed in claim 1, wherein the converter comprises a plurality of orbital angular momentum modulators, each arranged to receive a respective input optical signal and arranged to convert said input optical signal into a respective optical signal having a respective one of the plurality of helical wavefronts.

3. An optical switch as claimed in claim 2, wherein each input optical signal has a Hermite-Gaussian transverse mode and each of the orbital angular momentum modulators and each of the orbital angular momentum demodulators comprises a spiral phase mask.

4. A method of switching optical signals, the method comprising:
receiving a plurality of input optical signals, each having one of a plurality of wavelengths and each having a respective planar wavefront;
converting each input optical signal into a respective optical signal having a respective one of a plurality of helical wavefronts, each helical wavefront having a different orbital angular momentum;
multiplexing the helical wavefront optical signals into an orbital angular momentum multiplexed optical signal; and
demultiplexing the orbital angular momentum multiplexed optical signal into a plurality of wavelength multiplexed optical signals each having a different one of the orbital angular momenta and reconverting each wavelength multiplexed optical signal from its helical wavefront into a respective planar wavefront;
wherein demultiplexing the orbital angular momentum multiplexed optical signal comprises:
splitting the orbital angular momentum multiplexed optical signal into a plurality of replica signals; and
reconverting, at a plurality of orbital angular momentum demodulators, optical signals having a respective preselected one of the helical wavefronts into a wavelength multiplexed optical signal having a respective planar wavefront; and
delivering the reconverted wavelength multiplexed optical signal to its output.

5. A method as claimed in claim 4, wherein the orbital angular momentum multiplexed optical signal is demultiplexed by splitting it into a plurality of replica signals and for each replica signal reconverting optical signals having a respective preselected one of the helical wavefronts into a wavelength multiplexed optical signal having a respective planar wavefront.

6. An optical interconnection network comprising:
an optical switch as claimed in claim 1;
a plurality of optical transmitters, each arranged to receive input electrical signals carrying data cells to be transmitted across the interconnection network and comprising a wavelength scheduler arranged to assign one of a plurality of wavelengths to each input electrical signal and an electrical-to-optical converter arranged to convert each input electrical signal into an input optical signal at the respective assigned wavelength having a respective planar wavefront, the optical switch arranged to receive the input optical signals from the optical transmitters;
a plurality of optical receivers, each arranged to receive a respective planar wavefront wavelength multiplexed optical signal from a respective output of the optical demultiplexer of the optical switch, and each comprising a wavelength demultiplexer arranged to demultiplex the respective planar wavefront wavelength multiplexed optical signal into a plurality of output optical signals each at one of the plurality of wavelengths, an optical-to-electrical converter arranged to convert each output optical signal into a respective output electrical signal, and a plurality of electrical output ports each arranged to output electrical signals converted from output optical signals at a respective one of the plurality of wavelengths; and
a mode scheduler arranged to assign one of the plurality of orbital angular momenta to each input optical signal received at the converter, and arranged to generate and transmit to the converter at least one conversion control signal arranged to cause it to convert each input optical signal from its planar wavefront into a respective helical wavefront having the corresponding assigned orbital angular momentum.

7. An optical interconnection network as claimed in claim 6, wherein there are the same number of optical receivers as there are orbital angular momenta and each optical receiver has the same number of electrical output ports as the number of wavelengths.

8. An optical interconnection network as claimed in claim 6, wherein the mode scheduler is arranged to:
receive wavelength assignment information from each wavelength scheduler for a preselected time window;
interrogate the wavelength assignment information for each transmitter and the orbital angular momentum assigned by it to each input optical signal to identify any input optical signals having the same wavelength and orbital angular momentum; and
to select a different orbital angular momentum for at least one of the identified input optical signals.

9. Method of routing data cells across an optical interconnection network from a respective electrical input port of a respective transmitter module to a respective one of a plurality of electrical output ports of a plurality of receiver modules, the method comprising:
receiving a plurality of input electrical signals each carrying a data cell to be routed;
assigning one of a plurality of orbital angular momenta and one of a plurality of wavelengths to each input electrical signal, each assigned orbital angular momentum indicating a destination one of the receiver modules and each assigned wavelength indicating a destination one of the output ports of the destination receiver module;
converting each input electrical signal into an input optical signal at the respective assigned wavelength, each input optical signal having a respective planar wavefront;
converting each input optical signal into a respective optical signal having a respective one of a plurality of helical wavefronts, each helical wavefront having a different orbital angular momentum;
multiplexing the helical wavefront optical signals into an orbital angular momentum multiplexed optical signal; and
demultiplexing the orbital angular momentum multiplexed optical signal into a plurality of wavelength multiplexed optical signals each having a different one of the orbital angular momenta and reconverting each wavelength multiplexed optical signal from its helical wavefront into a respective planar wavefront;
wherein demultiplexing the orbital angular momentum multiplexed optical signal comprises:
splitting the orbital angular momentum multiplexed optical signal into a plurality of replica signals; and
reconverting, at a plurality of orbital angular momentum demodulators, optical signals having a respective preselected one of the helical wavefronts into a wavelength multiplexed optical signal having a respective planar wavefront;
delivering each planar wavefront wavelength division multiplexed optical signal to a respective one of the receiver modules according to the orbital angular momentum it had before reconversion;
demultiplexing each wavelength division multiplexed optical signal into a plurality of output optical signals each at one of the plurality of wavelengths and converting each output optical signal into a corresponding output electrical signal; and
delivering each output electrical signal to a respective one of the electrical output ports of the respective receiver module, according to its preconversion optical wavelength.

10. A method as claimed in claim 9, wherein the method further comprises assigning the orbital angular momenta and the wavelengths to the input electrical signals such that input electrical signals assigned the same orbital angular momentum are each assigned a different one of the plurality of wavelengths.

11. A data centre comprising:
a plurality of computer servers;
an optical interconnection network as claimed in claim 6; and
a plurality of communication links, each connecting a respective server to the optical interconnection network.

12. A non-transitory data carrier having computer readable instructions embodied therein, the computer readable instructions being for providing access to resources available on a processor and the computer readable instructions comprising instructions to cause the processor to perform the steps of the method of switching optical signals as claimed in claim 4.

13. A non-transitory data carrier having computer readable instructions embodied therein, the computer readable instructions being for providing access to resources available on a processor and the computer readable instructions comprising instructions to cause the processor to perform the steps of the method as claimed in claim 9 of routing data cells across an optical interconnection network from a respective electrical input port of a respective transmitter module to a respective one of a plurality of electrical output ports of a plurality of receiver modules.

* * * * *